US008032700B2

(12) United States Patent
Bruce et al.

(10) Patent No.: US 8,032,700 B2
(45) Date of Patent: *Oct. 4, 2011

(54) HYBRID MULTI-TIERED CACHING STORAGE SYSTEM

(75) Inventors: Rey H. Bruce, San Jose, CA (US); Noeme P. Mateo, Pasig (PH); Ricky S. Nite, Paranaque (PH)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,480

(22) Filed: Oct. 8, 2009

(65) Prior Publication Data

US 2010/0095053 A1 Apr. 15, 2010

Related U.S. Application Data

(63) Continuation of application No. 11/450,023, filed on Jun. 8, 2006, now Pat. No. 7,613,876.

(51) Int. Cl.
*G06F 12/00* (2006.01)

(52) U.S. Cl. .................................... 711/113; 711/203
(58) Field of Classification Search .................. 711/113, 711/203
See application file for complete search history.

(56) References Cited

U.S. PATENT DOCUMENTS

| 6,810,444 | B2 * | 10/2004 | Kimura .......................... 710/27 |
| 7,308,531 | B2 * | 12/2007 | Coulson ....................... 711/112 |
| 2006/0184673 | A1 * | 8/2006 | Liebman ....................... 709/225 |
| 2006/0274566 | A1 * | 12/2006 | Takashima et al. ........... 365/145 |
| 2007/0276882 | A1 * | 11/2007 | Nishimura et al. ........... 707/203 |

\* cited by examiner

*Primary Examiner* — Hashem Farrokh
(74) *Attorney, Agent, or Firm* — Uriarte Law

(57) ABSTRACT

A hybrid storage system comprising mechanical disk drive means, flash memory means, SDRAM memory means, and SRAM memory means is described. IO processor means and DMA controller means are devised to eliminate host intervention. Multi-tiered caching system and novel data structure for mapping logical address to physical address results in a configurable and scalable high performance computer data storage solution.

9 Claims, 21 Drawing Sheets

LBA-FLASH-HDD Table

| LBA Set Idx | Flash Remap Table | | | HDD Remap Table | |
|---|---|---|---|---|---|
| | PBA | Control Info | | HDD PBA or LBA | Control Info |
| | | Caching State | Other Flash Control Info | | |
| 0x0 | Entry for Host LBA set 0 | | | | |
| 0x1 | Entry for Host LBA set 1 | | | | |
| 0x2 | Entry for Host LBA set 2 | | | | |
| | | | | | |
| ⋮ | | | ⋮ | | |
| . | | | | | |

FIG. 10b

LBA-SDRAM Table

| LBA Set Idx | PBA | Control Info | |
|---|---|---|---|
| | | Caching State | Other Control Info |
| 0x0 | Entry for Host LBA set 0 | | |
| 0x1 | Entry for Host LBA set 1 | | |
| 0x2 | Entry for Host LBA set 2 | | |
| | | | |
| ⋮ | | ⋮ | |
| | | | |
| . | | | |

FIG. 10c

HYBRID MULTI-TIERED CACHING STORAGE SYSTEM

CROSS-REFERENCE TO RELATED APPLICATION(S)

This application is a Continuation Application claiming the benefit of U.S. patent application Ser. No. 11/450,023, filed 8 Jun. 2006, entitled "Multi-Tiered Caching Storage System", now U.S. Pat. No. 7,613,876 B2.

BACKGROUND

1. Field

The present invention relates to a data storage system which is applied to a computer system, and comprises volatile (e.g. SRAM, SDRAM) and nonvolatile (e.g. flash memory, mechanical hard disk) storage components.

2. Description of Related Art

In a conventional computer system, a hard disk drive (HDD) is used as an external memory device wherein a magnetic disk is used as a storage medium. The HDD can be used as a large-capacity file apparatus. However, as compared to a main memory comprising a semiconductor memory (e.g. a DRAM), the access speed of the HDD is lower. A cache system for the HDD has been known as a means for increasing the access speed of the HDD. Dynamic random access memory (DRAM) and flash memory have been used to implement a cache system for the HDD. However, the translation from logical address to physical address format suitable for accessing flash memory and a HDD consume resources of the host computer and affects performance. Accordingly there is a need for a hybrid storage system wherein the performance is improved through elimination of host intervention.

Enterprise-level storage systems typically use arrays of hard disk drives (HDD) as mass storage units, or configured as RAID systems. Data users or clients access the data using standard block-based IO interfaces or over the network using standard file-based access protocols. The HDD array data is managed by dedicated host computers that run storage management applications. As several interface controllers are employed in both host and client systems, enterprise-level storage systems will benefit from a controller architecture that integrates block-based access and file-based or random access to the data. The integration of data transfer controllers for different interfaces in the previously mentioned hybrid storage system that implements multi-tiered caching system for a HDD will extend the benefits of HDD data caching to HDD array systems.

SUMMARY OF THE INVENTION

A hybrid storage system comprising mechanical disk drive means, flash memory means, SDRAM memory means, and SRAM memory means for data storage is described. An IO processor means and multiple DMA controller means are devised to eliminate host intervention. Employing a multi-tiered caching system and novel data structures for mapping a logical address to a physical address enables the formation of a configurable and scalable high performance computer data storage solution.

A LBA-Flash-HDD table has a first portion for mapping a logical address to a flash address and a second portion for mapping the logical address to a disk drive address. A copy is stored in the flash memory, a most frequently used portion is stored in SRAM, and the remainder stored in SDRAM together constitute a working copy. A back-up copy is stored in the mechanical disk drive. A LBA_SDRAM table is used to map the logical address to SRAM and SDRAM addresses. The LBA_SDRAM table is stored in SDRAM and cached in SRAM. Several DMA controllers are provided for moving data among multi-tiered storage devices. IO processor implements a uniform method for DMA by preparing DMA instructions in linked list format.

In an embodiment of the present invention IO processor, DMA controllers, and all necessary control functions are integrated in a SOC device. Eight configurations of the storage solution are provided. In the first example embodiment of the present invention, the storage system SOC device is configured as a slave device and interfaces with the host system through a system bus that is capable of random access and DMA such as PCI/PCI-X/PCI Express, and also interfaces with mechanical disk drives through a standard IO storage interface such as ATA or SCSI.

In the second example embodiment of the present invention, the storage system SOC device is configured as a host system that interfaces with an external storage device through a system bus that is capable of random access and DMA such as PCI/PCI-X/PCI Express.

In the third example embodiment of the present invention, the storage system SOC device is configured as a standalone host system that interfaces with mechanical disk drives through a standard IO storage interface such as SCSI, and also interfaces to a network through a standard IO network interface such as Ethernet.

In the fourth example embodiment of the present invention, the storage system SOC device is configured as a slave device and interfaces with the host system through an internal standard IO, such as Fibre Channel and interfaces with mechanical disk drives through a second standard IO interface such as USB.

In the fifth example embodiment of the present invention, the storage system SOC device is configured as a host system that interfaces with an external storage device through an external standard IO storage interface, such as Fibre Channel, and also interfaces to a network through a standard IO network interface such as Ethernet.

In the sixth example embodiment of the present invention, the storage system SOC device is configured as a slave device and interfaces with the host system through an external standard IO interface, such as Fibre Channel and interfaces with mechanical disk drives through a second standard IO interface such as USB.

In the seventh example embodiment of the present invention, the storage system SOC device is configured as a host system that interfaces with an external storage device through an internal standard IO storage interface, such as Fibre Channel, and also interfaces to a network through a standard IO network interface such as Ethernet.

In the eighth example embodiment of the present invention, the storage system SOC device is configured as a slave device and integrated into a mechanical disk drive in a single enclosure and interfaces with the host system through a standard IO interface such as SCSI and interfaces with the magnetic disk controller through low level direct connections.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 10b is a diagram illustrating an example data structure for LBA-Flash-HDD mapping table according to an embodiment of the present invention.

FIG. 10c is a diagram illustrating an example data structure for LBA-SDRAM mapping table according to an embodiment of the present invention.

DETAILED DESCRIPTION OF THE INVENTION

Figure 1:
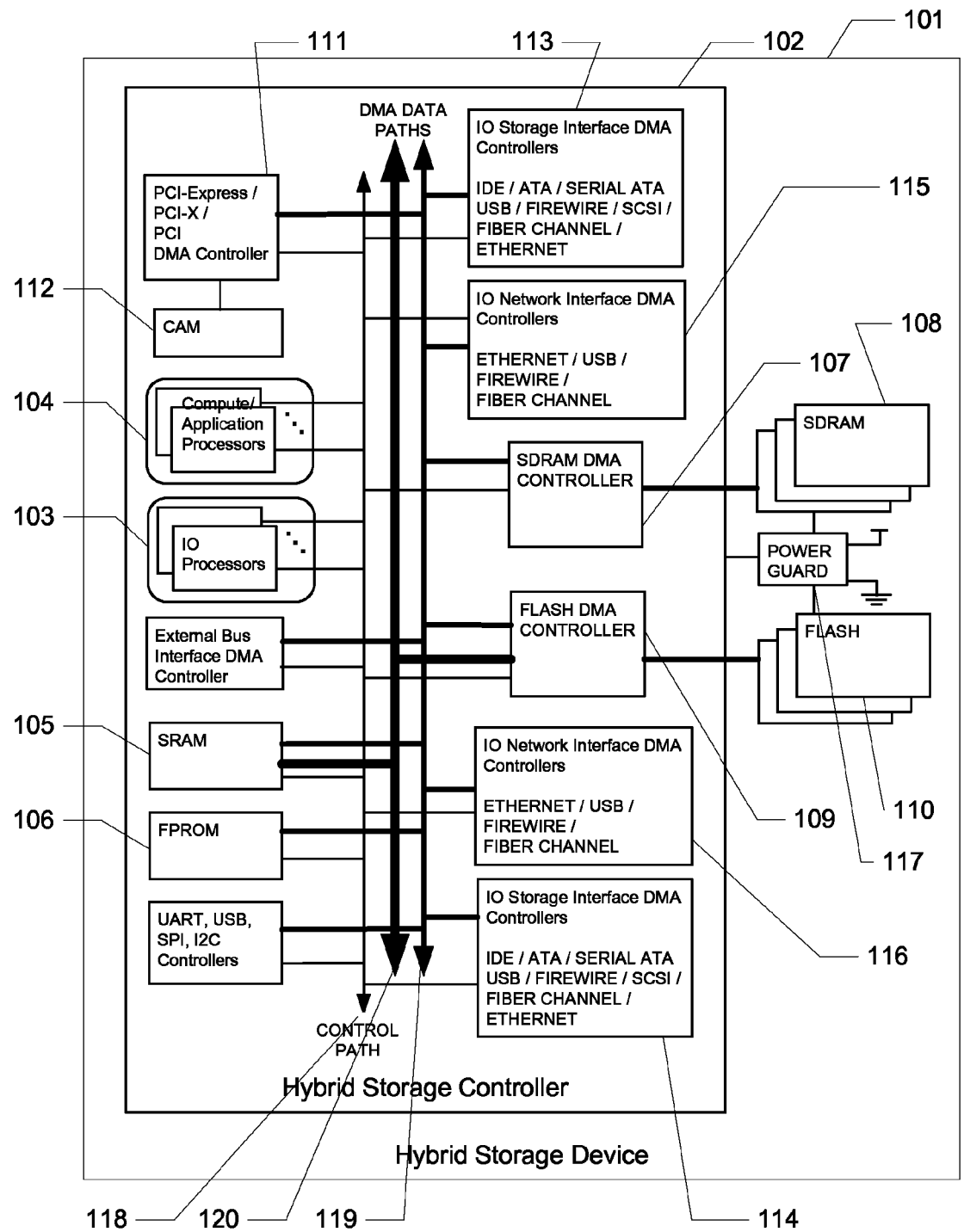
FIG. 1 is a diagram illustrating the components comprising the hybrid storage device according to an embodiment of the present invention.

FIG. 1 is a diagram illustrating the components comprising the hybrid storage device 101 according to an embodiment of the present invention.

The hybrid storage device 101 comprises several storage devices listed as follows in order of increasing storage capacity and decreasing access time—embedded SRAM 105, array of SDRAM devices 108, array of flash devices 110 and array of hard drives (not shown). Three levels of caching are implemented in the storage system: flash array caches data in hard drives, SDRAM array caches data in flash array, SRAM caches data in SDRAM array. The main non-volatile storage component comprises one or more hard disks (not shown).

Hybrid storage controller 102 is a chip that manages the storage system. It contains multiple embedded DMA controllers:

PCI-Express/PCI-X/PCI DMA controller 111 handles byte or word addressable access to stored data by any device connected via a system bus such as: PCI-Express, PCI-X, PCI interface. Content addressable memory (CAM) 112 stores a look-up table used by the PCI-Express/PCI-X/PCI interface DMA Controller to look-up the block address associated with the byte or word address.

IO Storage DMA Controller 113 and IO Storage DMA Controller 114 handle DMA via standard block access IO interfaces such as: IDE/ATA, serial ATA, USB, SCSI, etc. The said IO DMA Controllers can be used to connect to a host computer system through an IO interface. They can also be used to control arrays of hard disks.

IO Network Interface DMA Controller 115 and IO Network Interface DMA Controller 116 handle DMA to a network interface such as: ETHERNET, USB, FIREWIRE, and FIBRE CHANNEL.

Flash DMA Controller 109 handles DMA to the flash array 110.

SDRAM Controller 107 handles DMA to the SDRAM array 108.

Hybrid storage controller 102 contains an IO processor 103 that can be implemented using one or more embedded processors. The IO processor handles the processing of host commands (read/write) and runs the algorithms for managing the different storage media. The implementation of the caching algorithm and maintenance of control structures such as translation tables is transparent to external entities that use or connect to the storage system such as a host computer system.

One or more additional embedded processor(s) 114 can function as compute/application processors 104 running over conventional O/S such as Windows, Linux, etc. The SDRAM 105 can be shared between the IO processor and the application processor(s). Several DMA paths 119,120 are provided to avoid data bottlenecks. The different storage media can be connected in different ways to the DMA paths to achieve the most optimized traffic distribution. For example, at least one of the DMA paths 120 can be used as dedicated path between the SRAM 105 and the flash array 110. During reads to data that is in the flash array, if the traffic is heavy on the other paths, then this DMA path 119 can be used to transfer data from the flash array 110 to a temporary store buffer in the SRAM 105. Furthermore, separate control paths 118 are provided for the embedded processors to access the register interface of the different DMA controllers, reducing the control overhead on the high-speed DMA paths 119,120. A Field-Programmable ROM 106 can be employed to store boot code for the IO processor.

Figure 10A:
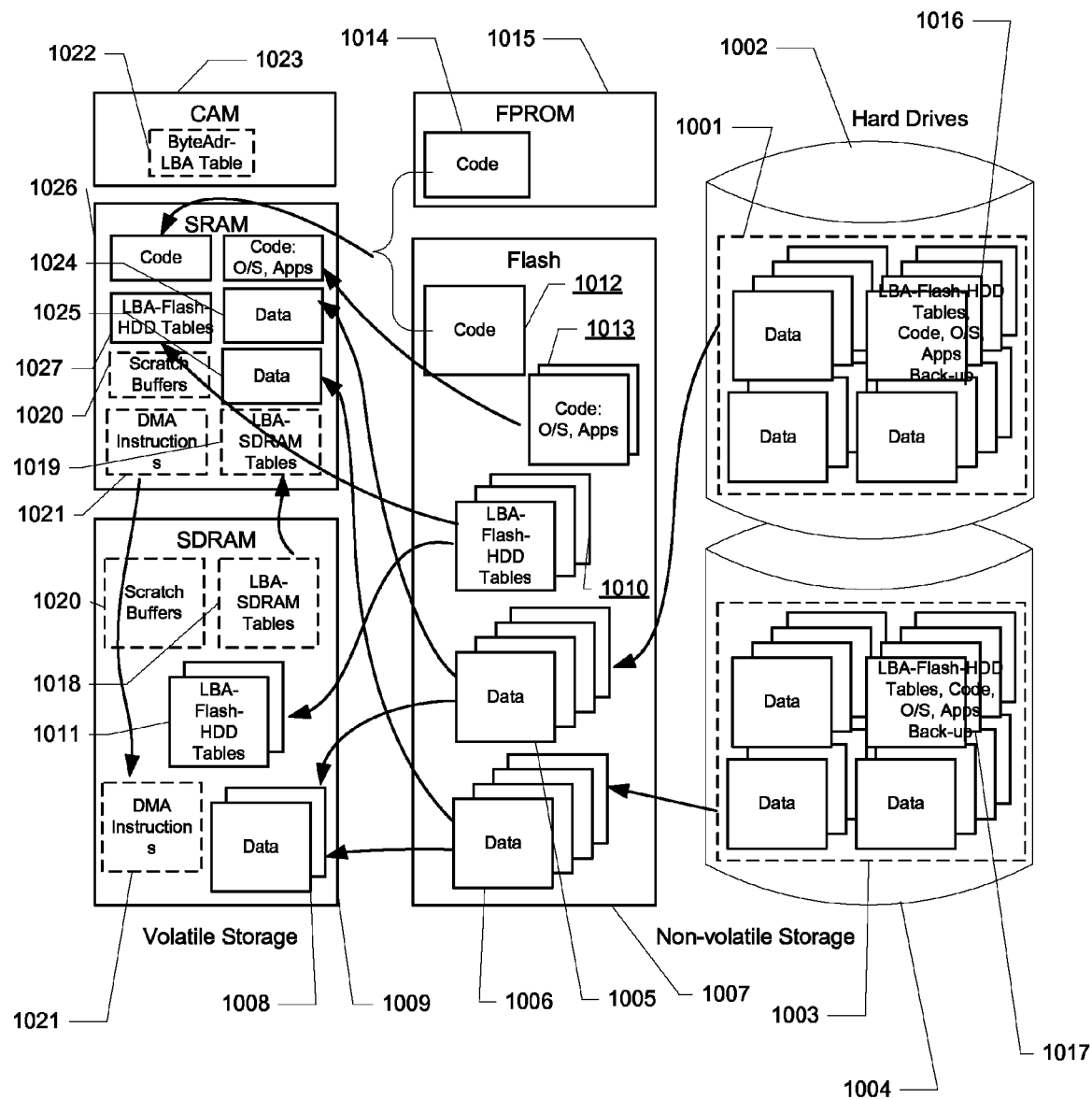
FIG. 10a is a diagram illustrating the data structures inside the nonvolatile and volatile storage components according to an embodiment of the present invention.

During normal operation, data and control information is distributed among the storage components, as illustrated in FIG. 10a and discussed in detail later in this description. PowerGuard 117 ensures that the data in the flash 110, SDRAM 108 and in all the components in the hybrid storage controller 102 are protected in the event of power loss. The data in the volatile SDRAM and SRAM will get flushed to the flash. Thus, the flash retains all cached data and control information. PowerGuard protects all the components in the hybrid storage controller 101 including the embedded processors and all embedded FIFOs, internal RAMs. On power loss, processing of retained information in these components continues. Transient data from the external entities that connect to the hybrid storage device will not be accepted.

Figure 16:
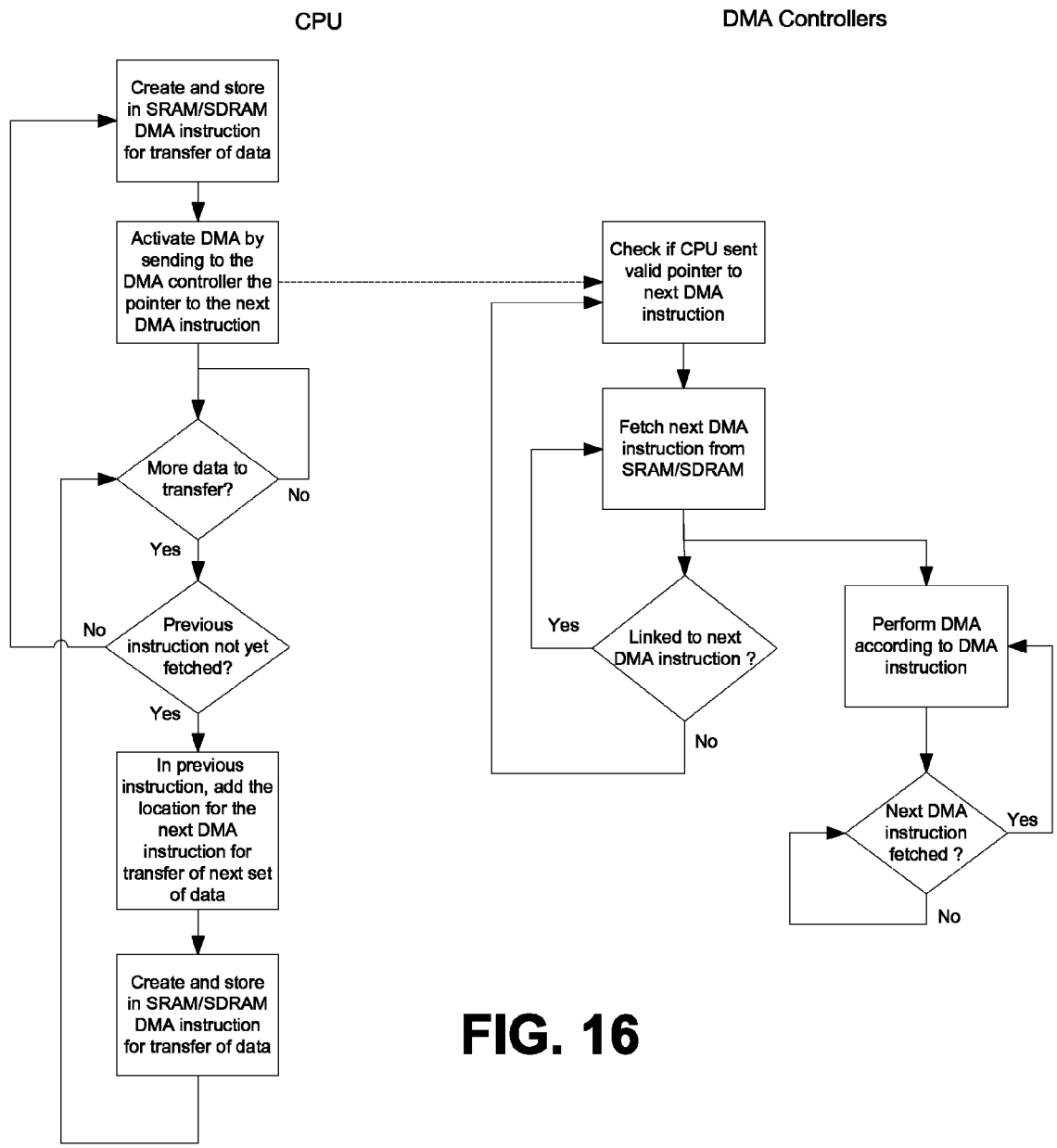
FIG. 16 is a diagram illustrating a process flow of a DMA transfer according to an embodiment of the present invention.

The IO processor 103 instructs the IO Storage Interface DMA controllers 113 and 114, the IO Network Interface DMA controllers 115 and 116, the PCI-Express/PCI-X/PCI DMA controller 111 and the flash DMA controller 109 to transfer data between the SRAM 105 or SDRAM 108 and their respective interfaces. The storage system is managed such that data transferred by the DMA controllers to their respective interfaces are always cached in the SRAM 105 or SDRAM 108 which provide faster access compared to the flash 110 and the hard drives (not shown). The IO processor 103 includes in the instructions such information as the direction of the data transfer, the source and destination addresses, the size of data to be transferred, and all other interface-specific control information. The instructions are stored to the SRAM 105 or SDRAM 108. Each instruction contains a link to the next instruction. Hence, after the IO processor 103 posts an initial instruction via the control bus to any of the DMA controllers, the DMA controller can automatically fetch the next instruction from the SRAM 105 or SDRAM 108. The IO processor 103 is then informed of the completion of a data transfer by the DMA controller. The process flow for performing DMA transfers is illustrated in FIG. 16 and discussed in detail later in this description.

Figure 2:
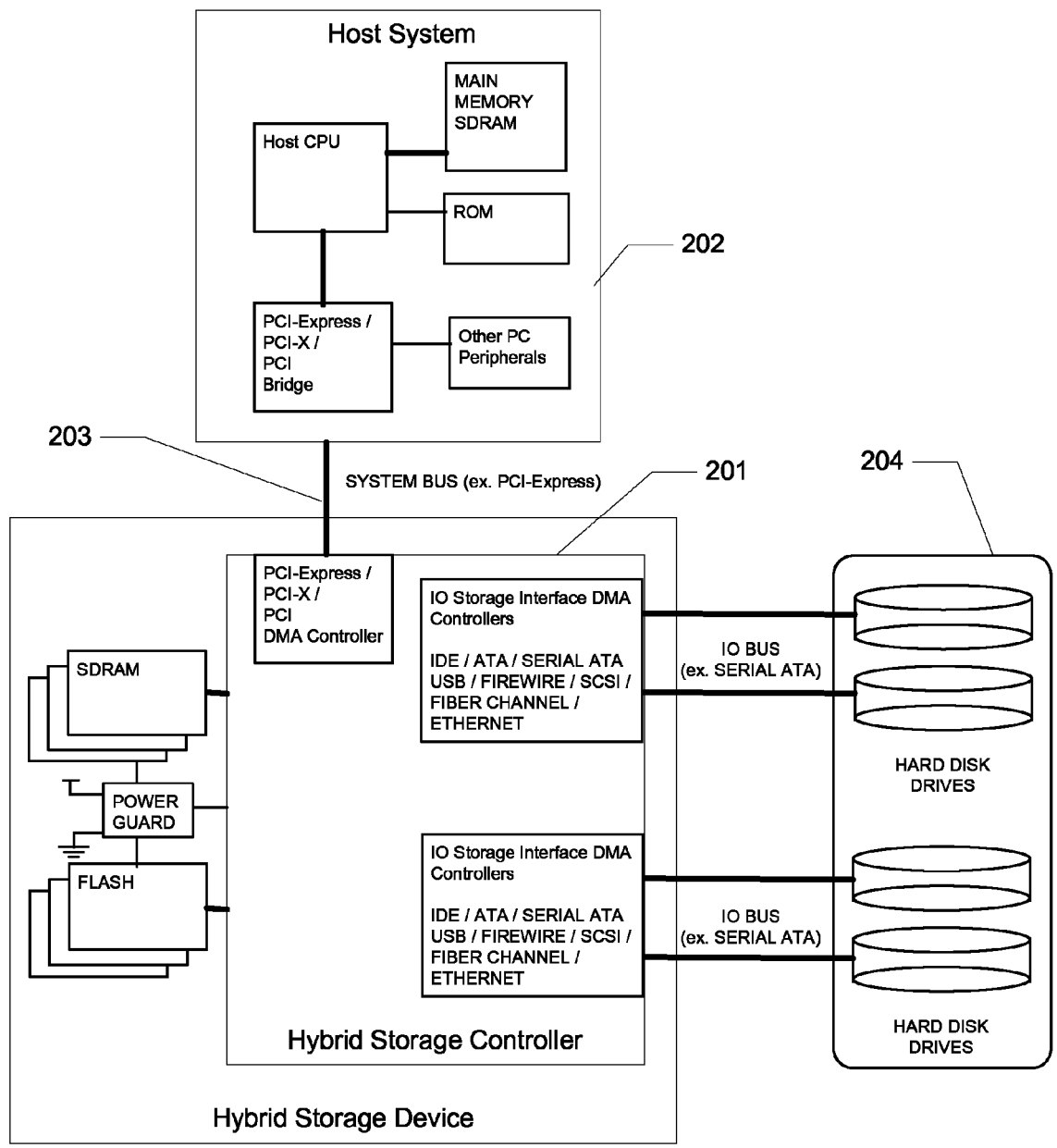
FIG. 2 is a diagram illustrating an example configuration of an embodiment of the present invention where the storage system SOC device is configured as a slave device and interfaces with the host system through a system bus that is capable of random access and DMA such as PCI/PCI-X/PCI Express, and also interfaces with mechanical disk drives through a standard IO storage interface such as ATA or SCSI.

FIG. 2 is a diagram illustrating an example configuration of an embodiment of the present invention. In this configuration, the hybrid storage controller 201 is configured as a slave device and interfaces with the host system 202 through a system bus that is capable of random access and DMA such as PCI/PCI-X/PCI Express. The hybrid storage device controls an array of hard disk drives 204 through a standard IO storage interface such as Serial ATA.

Figure 3:
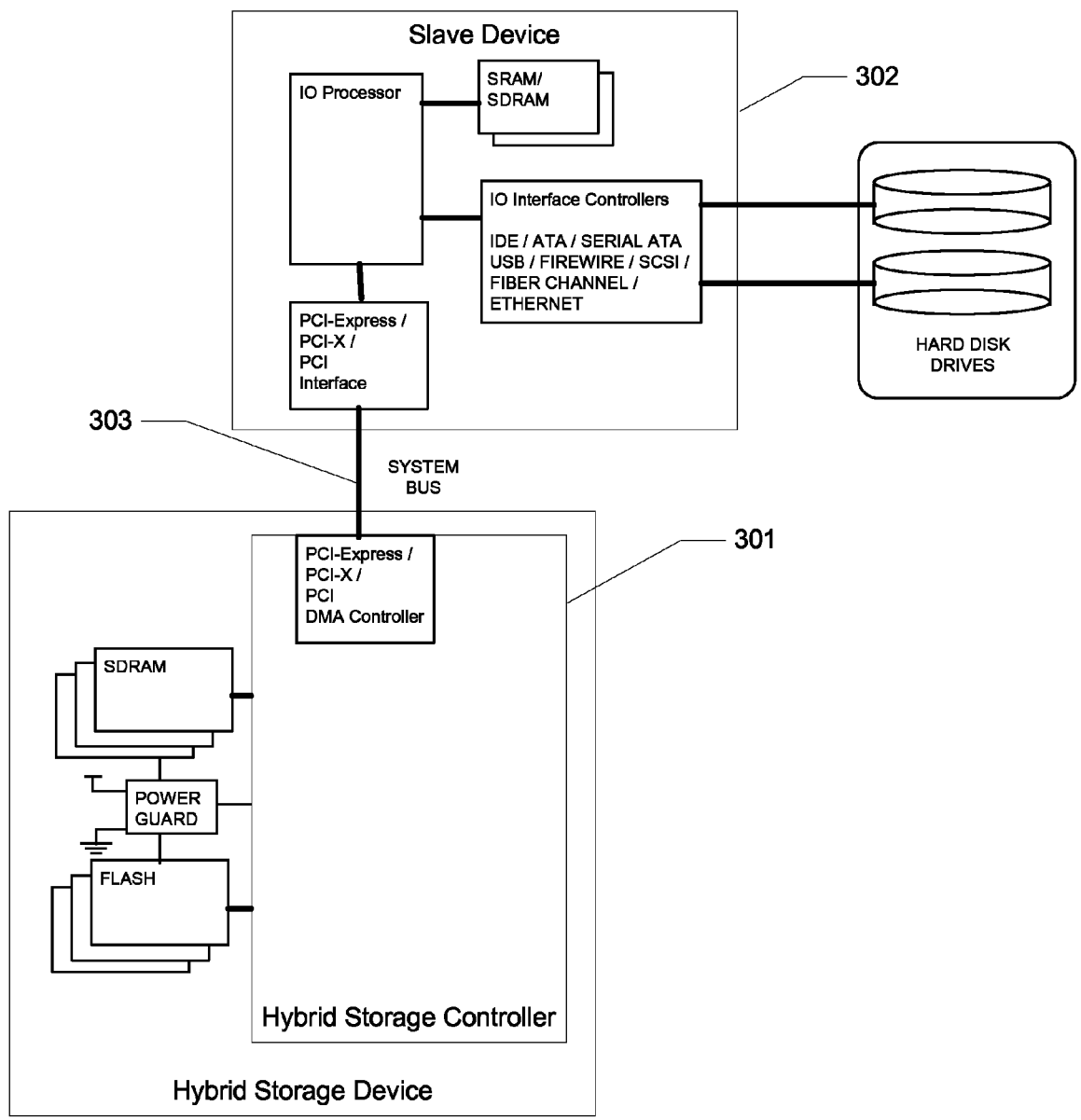
FIG. 3 is a diagram illustrating a second example configuration of an embodiment of the present invention where the storage system SOC device is configured as a host system that interfaces with an external storage device through a system bus that is capable of random access and DMA such as PCI/PCI-X/PCI Express.

FIG. 3 is a diagram illustrating a second example configuration of an embodiment of the present invention. It shows that the hybrid storage controller 301 can also be configured as a Host system controlling a slave device 302 through a system bus 303 such as PCI/PCI-X/PCI Express. In the illustration, the slave device 302 is actually a hard disk array controller. Since the hybrid storage device is itself configurable to function as a hard disk array controller with an interface to a system bus, then two hybrid storage devices could be interconnected using their PCI/PCI-X/PCI-Express DMA controller where one is a slave device to the other.

Figure 4:
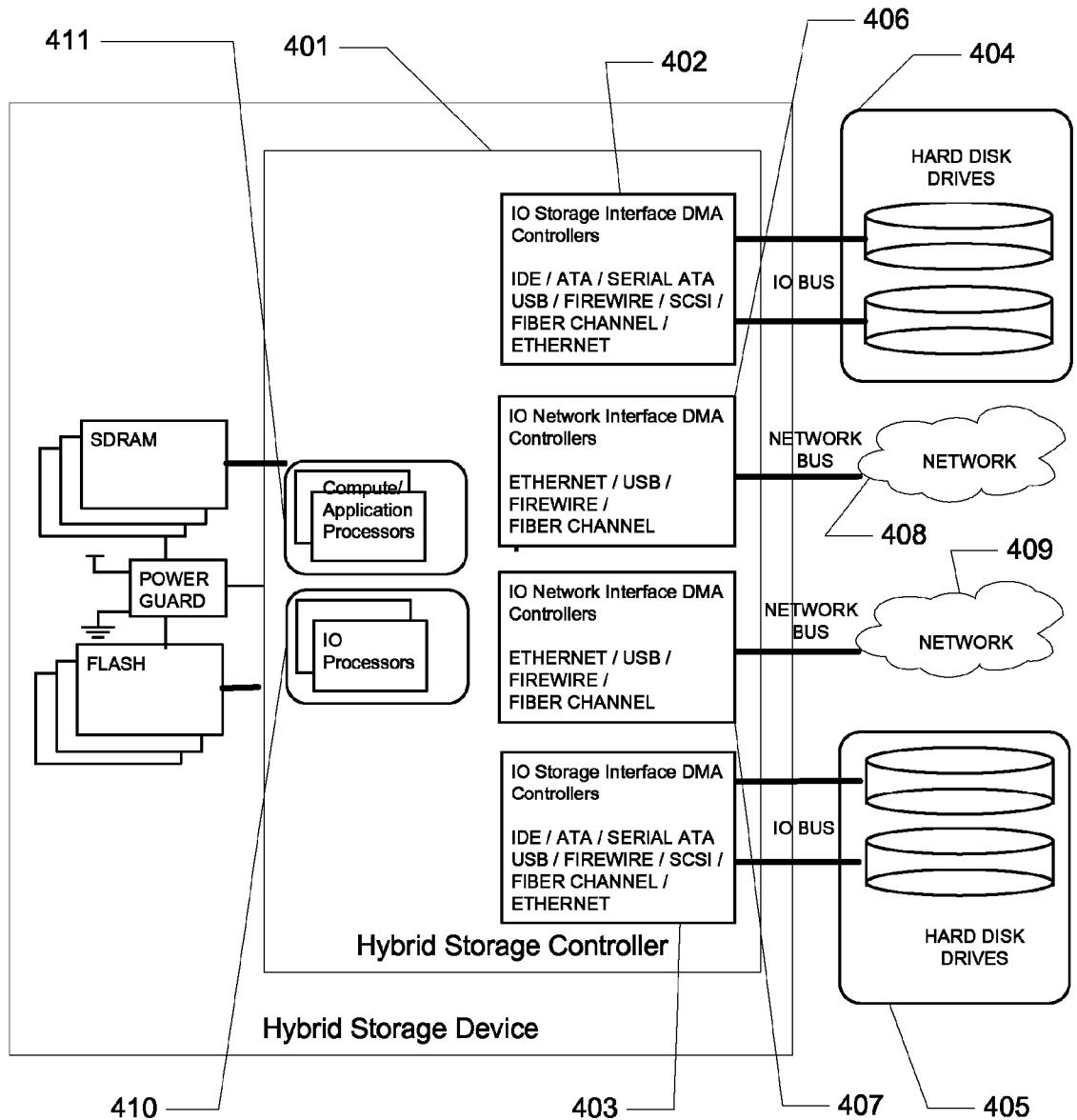
FIG. 4 is a diagram illustrating a third example configuration of an embodiment of the present invention where the storage system SOC device is configured as a standalone host system that interfaces with mechanical disk drives through a standard IO storage interface such as SCSI, and also interfaces to a network through a standard IO network interface such as Ethernet.

FIG. 4 is a diagram illustrating a third example configuration of an embodiment of the present invention. It shows the hybrid storage controller 401 is configured as a standalone host system that interfaces with a hard disk drive arrays through a standard IO storage interface such as SCSI, and also interfaces to a network through a standard IO network interface such as Ethernet. The IO Storage Interface DMA Controller 402 handles DMA to the hard disk array 404. The IO Storage Interface DMA Controller 403 handles DMA to the hard disk array 405. The IO Network Interface DMA Controller 406 handles the connection to network 408. The IO Network Interface DMA Controller 407 handles the connection to network 409. The embedded IO Processor 410 coordinates the operation of the said DMA controllers. Since the hybrid storage device functions as a standalone system, then other software applications can be run on the additional embedded Compute/Application processor(s) 411.

Figure 5:
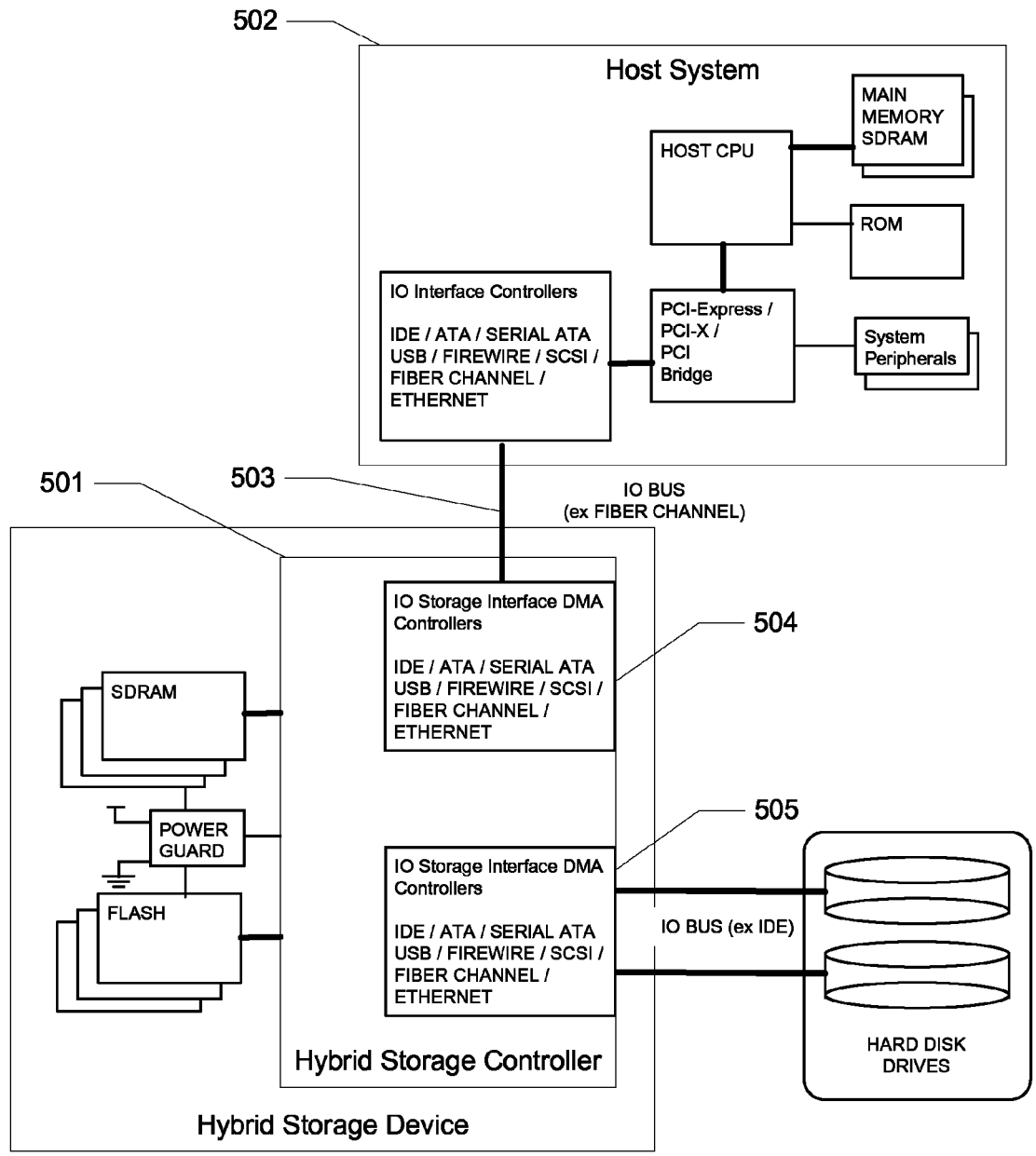
FIG. 5 is a diagram illustrating a fourth example configuration of an embodiment of the present invention where the storage system SOC device is configured as a slave device and interfaces with the host system through an internal standard IO, such as Fibre Channel, and interfaces with mechanical disk drives through a second standard IO interface such as USB.

FIG. 5 is a diagram illustrating a fourth example configuration of an embodiment of the present invention. The hybrid storage controller 501 is configured as a slave device and interfaces with the host system 502 through a standard Block-access IO bus 503, such as Fibre Channel, and interfaces with hard disk drives through a second standard IO interface such as IDE. The hybrid storage device in this case uses the internal IO Storage Interface DMA controllers 504 and 505 embedded the hybrid storage controller 501 to handle the interface to both the host system 502 and the hard disk drives.

Figure 6:
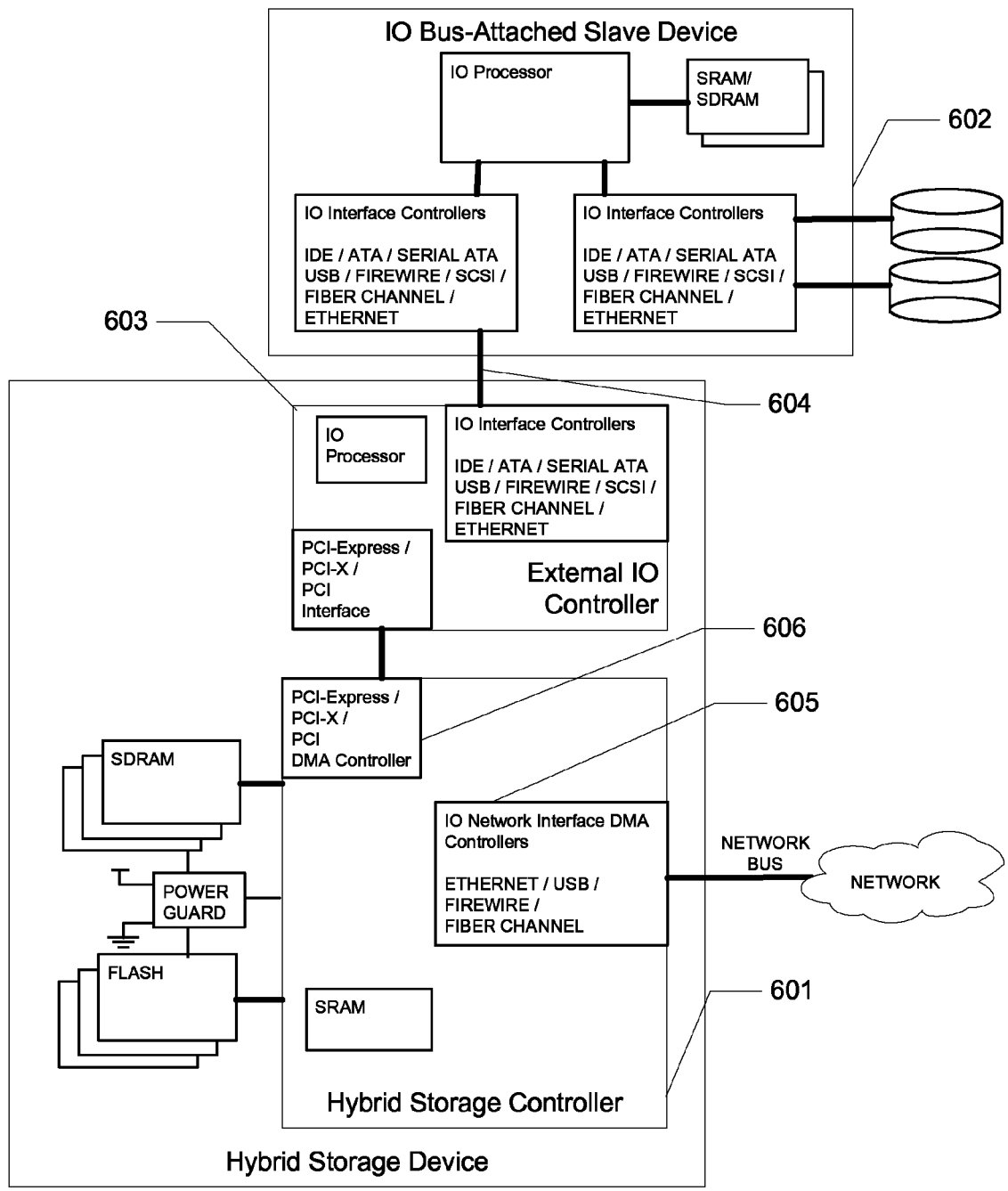
FIG. 6 is a diagram illustrating a fifth example configuration of an embodiment of the present invention where the storage system SOC device is configured as a host system that interfaces with an external storage device through an external standard IO storage interface, such as Fibre Channel, and also interfaces to a network through a standard IO network interface such as Ethernet.

FIG. 6 is a diagram illustrating a fifth example configuration of an embodiment of the present invention. The hybrid storage controller 601 is configured as a host system that interfaces to an external storage device 602 through an external standard IO interface controller 603 connected to it via an IO bus, such as Fibre Channel 604. The external storage device may also be another hybrid storage device. The hybrid storage controller also interfaces to a network through a standard IO network interface such as Ethernet 605. The hybrid storage controller uses the PCI-Express/PCI-X/PCI DMA Controller 606 to configure and control the operation of the external IO interface controller and to transfer IO commands, data and status information to and from the external storage device through the external IO interface controller. The PCI-Express/PCI-X/PCI DMA Controller has master and slave interfaces such that either the hybrid storage controller or external IO controller may initiate a DMA transaction. To send IO commands to the external storage device where the external IO controller acts as a DMA slave, the hybrid storage controller writes the IO commands to the external IO controller using the hybrid storage controller PCI-Express/PCI-X/PCI DMA master interface 605. The external IO controller establishes the command phase on the IO bus to send the IO command. To send IO commands to the external storage device where the external IO controller acts as a DMA master, the hybrid storage controller indicates the location of the IO command buffer in SRAM or SDRAM to the external IO controller. The external IO controller reads the IO command from the hybrid storage controller using the hybrid storage controller PCI-Express/PCI-X/PCI DMA slave interface and establishes the command phase on the IO bus to send the IO command to the external storage device. To transfer data to or from the external storage device where the external IO controller acts as a DMA slave, the hybrid storage controller writes to or reads data from the external IO controller when the IO data phase is established on the IO bus using the hybrid storage controller PCI-Express/PCI-X/PCI DMA master interface. To transfer data to or from the external storage device where the external IO controller acts as a DMA master, the hybrid storage controller indicates the data cache buffer location in SRAM or SDRAM to the external IO controller so that when the IO data phase is established on the IO bus, the external IO controller can write data to or read data from the hybrid storage controller using the hybrid storage controller PCI-Express/PCI-X/PCI DMA slave interface. The data is written to or read from the data cache in SRAM or SDRAM. To receive IO status information from the external storage device where the external IO controller acts as a DMA master, the external IO controller interrupts the hybrid storage controller when a status phase is completed on the IO bus so that the hybrid storage controller can read the received IO status information from the external IO controller through the hybrid storage controller PCI-Express/PCI-X/PCI DMA master interface and transfer it to the IO status buffer in SRAM 707 or SDRAM 708. To receive IO status information from the external storage device where the external IO controller acts as a DMA master, the hybrid storage controller initially indicates the IO status buffer location in SRAM or SDRAM to the external IO controller so that when a status phase is completed on the IO bus, the external IO controller can write the received IO status information to the IO status buffer in the hybrid storage controller through the hybrid storage controller PCI-Express/PCI-X/PCI DMA slave interface.

Figure 7:
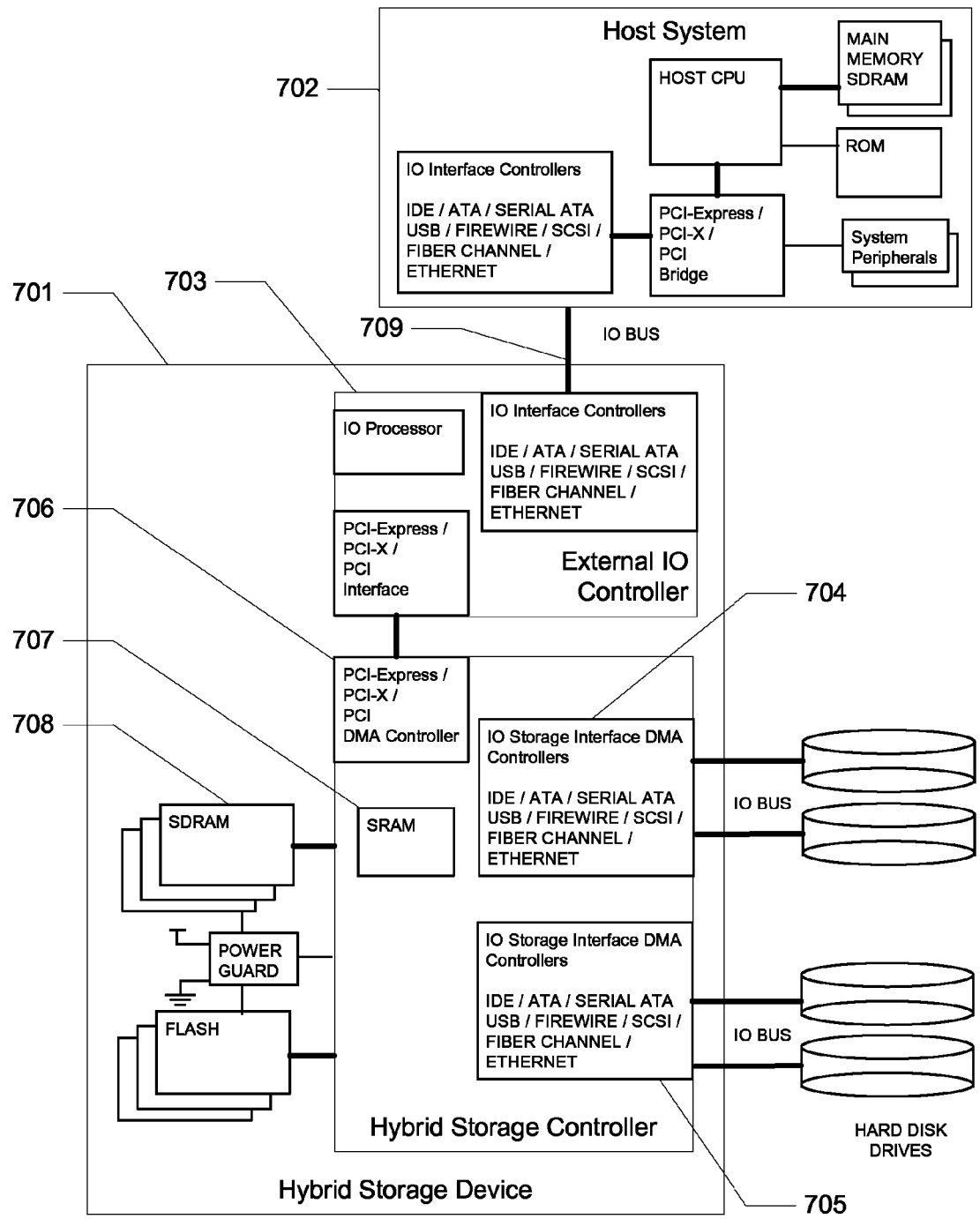
FIG. 7 is a diagram illustrating a sixth example configuration of an embodiment of the present invention where the storage system SOC device is configured as a slave device and interfaces with the host system through an external standard IO interface, such as Fibre Channel, and interfaces with mechanical disk drives through a second standard IO interface such as USB.

FIG. 7 is a diagram illustrating a sixth example configuration of an embodiment of the present invention. The hybrid storage controller 701 is configured as a slave device and interfaces with the host system 702 through an external IO interface controller 703 by using a standard IO interface, such as Fibre Channel, and interfaces with mechanical disk drives through internal standard IO interfaces such as Serial Attached SCSI and Serial ATA 704 705. The hybrid storage controller uses the PCI-Express/PCI-X/PCI DMA Controller 706 to configure and control the operation of the external IO interface controller and to transfer IO commands, data and status information to and from the host system through the external IO interface controller. The PCI-Express/PCI-X/PCI DMA Controller has master and slave interfaces such that either the hybrid storage controller or external IO controller may initiate a DMA transaction. To transfer IO commands from the host where the external IO controller acts as a DMA slave, the external IO controller interrupts the hybrid storage controller when a command phase is completed on the bus 709 so that the hybrid storage controller can read the received IO commands from the external IO controller through the hybrid storage controller PCI-Express/PCI-X/PCI DMA master interface and transfer it to the IO command buffer in SRAM 707 or SDRAM 708. To transfer IO commands from the host where the external IO controller acts as a DMA master, the hybrid storage controller initially indicates the IO command buffer location in SRAM or SDRAM to the external IO controller so that when a command phase is completed on the IO bus, the external IO controller can write the received IO command to the IO command buffer in the hybrid storage controller through the hybrid storage controller PCI-Express/PCI-X/PCI DMA slave interface. To transfer data to or from the host where the external IO controller acts as a DMA slave, the hybrid storage controller writes to or reads data from the external IO controller when the IO data phase is established on the IO bus using the hybrid storage controller PCI-Express/PCI-X/PCI DMA master interface. To transfer data to or from the host where the external IO controller acts as a DMA master, the hybrid storage controller indicates the data cache buffer location in SRAM or SDRAM to the external IO controller so that when the IO data phase is established on the IO bus, the external IO controller can write data to or read data from the hybrid storage controller using the hybrid storage controller PCI-Express/PCI-X/PCI DMA slave interface. The data is written to or read from the data cache in SRAM or SDRAM. To send IO status information to the host where the external IO controller acts as a DMA slave, the hybrid storage controller writes the IO status information to the external IO controller using the hybrid storage controller PCI-Express/PCI-X/PCI DMA master interface. The external IO controller establishes the IO status phase on the IO bus and sends the IO status information to the host. To send IO status information to the host where the external IO controller acts as a DMA master, the hybrid storage controller indicates the location of the IO status information in SRAM or SDRAM to the external IO controller so that when the IO status phase is established on the IO bus, the external IO controller can read the IO status information from the hybrid storage controller using the hybrid storage controller PCI-Express/PCI-X/PCI DMA slave interface.

Figure 8:
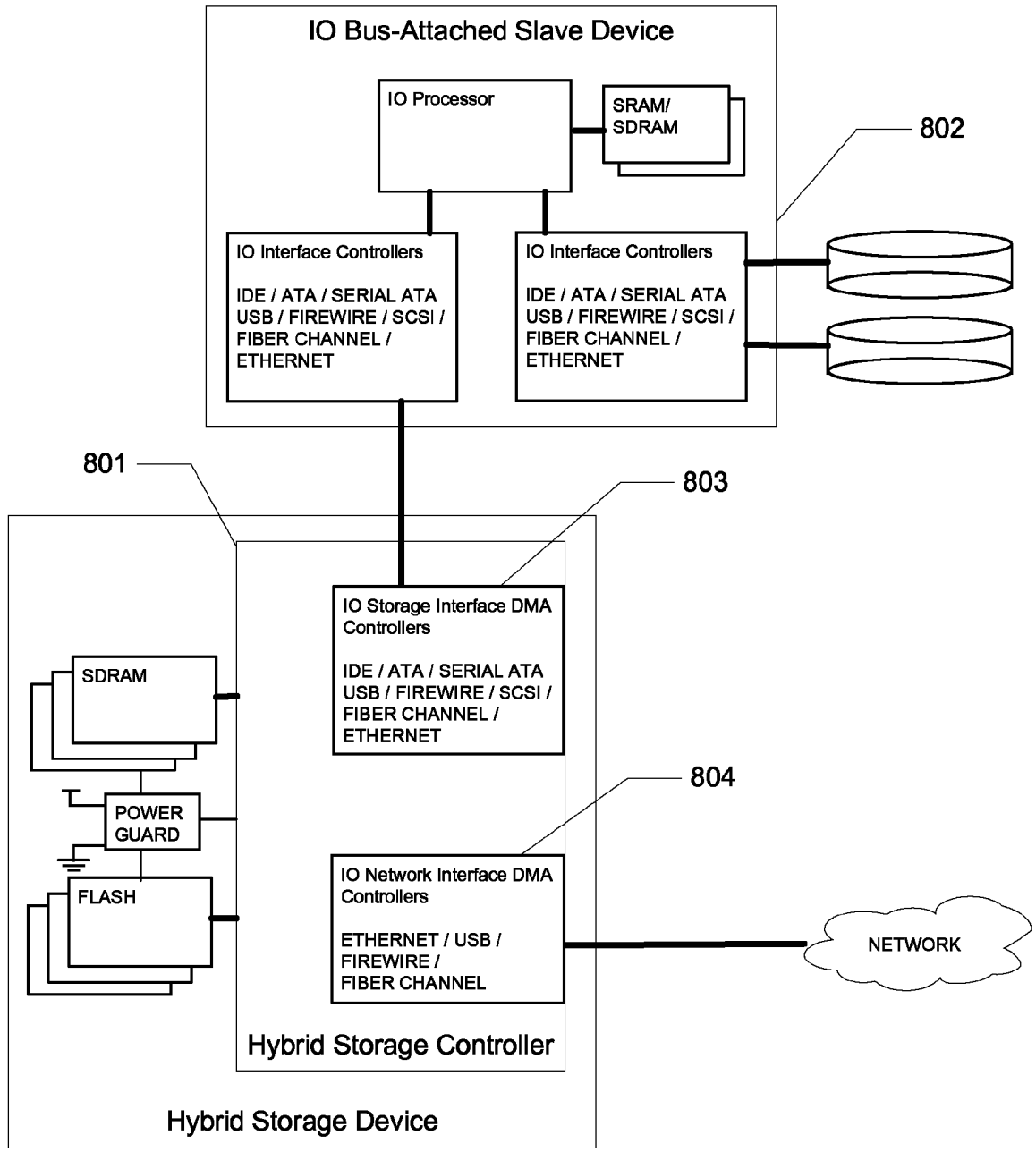
FIG. 8 is a diagram illustrating a seventh example configuration of an embodiment of the present invention where the storage system SOC device is configured as a host system that interfaces with an external storage device through an internal standard IO storage interface, such as Fibre Channel, and also interfaces to a network through a standard IO network interface such as Ethernet.

FIG. 8 is a diagram illustrating a seventh example configuration of an embodiment of the present invention where the hybrid storage controller 801 is configured as a host system that interfaces with an external storage device 802 through an internal standard IO storage interface such as Serial Attached SCSI 803, and also interfaces to a network through a standard IO network interface such as Ethernet 804. The external storage device may also be another hybrid storage device.

Figure 9:
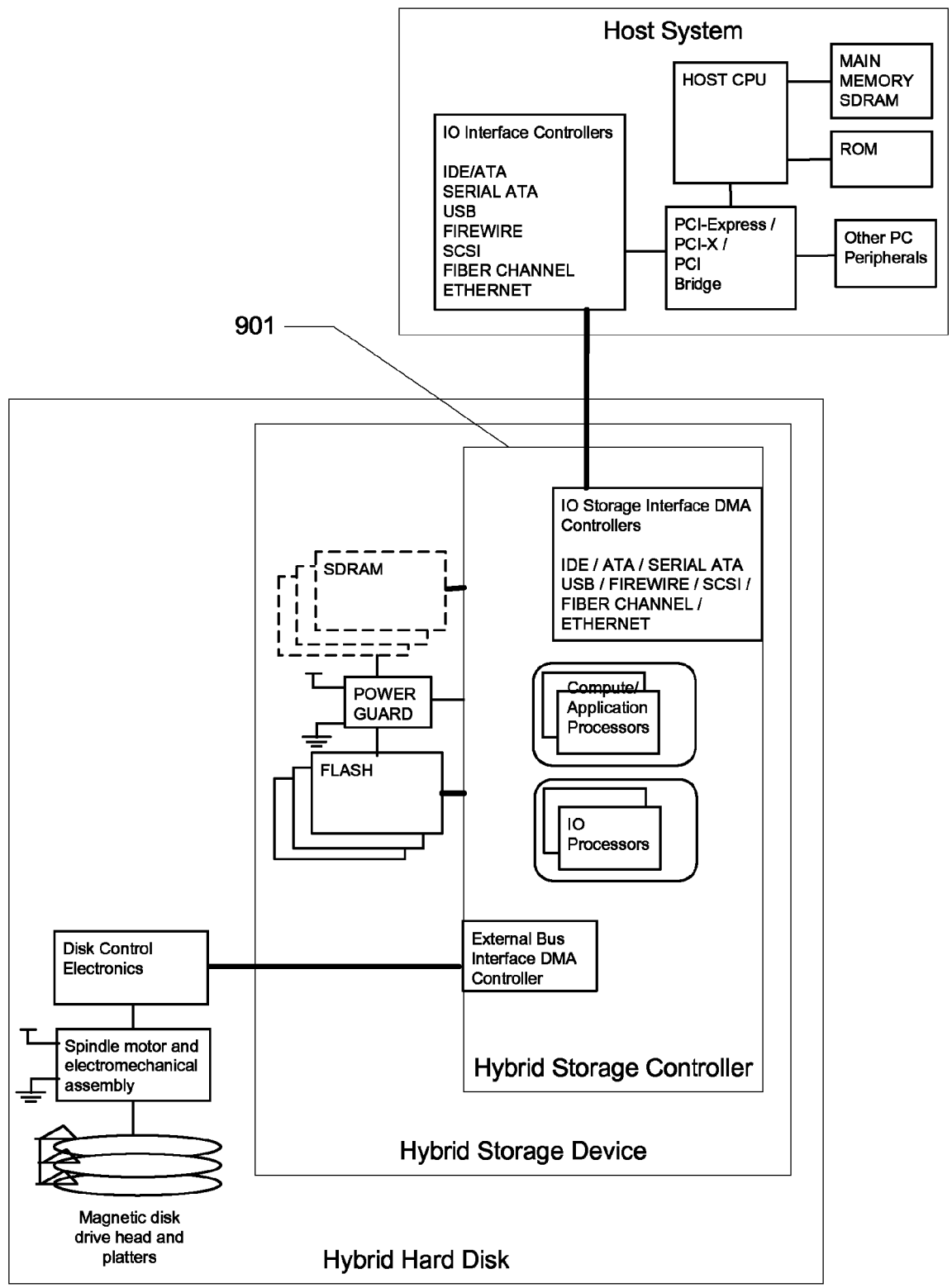
FIG. 9 is a diagram illustrating an eighth example configuration of an embodiment of the present invention where the storage system SOC device is configured as a slave device and integrated into a mechanical disk drive in a single enclosure and interfaces with the host system through a standard IO interface such as SCSI and interfaces with the magnetic disk controller through low level direct connections.

FIG. 9 is a diagram illustrating an eighth example configuration of an embodiment of the present invention where the hybrid storage controller device 901 is configured as a slave device and integrated into a hybrid hard disk contained within a single disk drive enclosure, and interfaces with the host system through a standard IO interface such as Serial ATA and interfaces with the magnetic disk controller through low level direct connections.

FIG. 10a is a diagram illustrating the data structures in the nonvolatile and volatile memory components of the storage system according to an embodiment of the present invention. FIG. 10a illustrates the different storage media and how each are used to store and cache data, code, and other control data structure. Data 1001 are blocks of data stored permanently in a hard drive 1002. Data 1003 are blocks of data stored permanently in a hard drive 1004. The flash also provides permanent storage for data. The data 1005 in the flash 1007 is a cached portion of the data 1001 in the hard drive 1002. The data 1006 in the flash 1007 is a cached portion of the data 1003 the hard drive 1004. The SDRAM 1009 provides faster access storage for data compared to flash 1007 and hard drive 1002 and 1004. The data 1008 in the SDRAM 1009 are the cached portions of the data 1005 and 1006 in the flash 1007. These cached portions are most recently read from or written to the storage system 1000 by the host system (not shown). The SRAM 1026 is the fastest-access storage device that can be used to store data. In the figure, data 1024 in the SRAM 1026 are also cached portions of data 1005 in the flash 1007. Data 1025 in SRAM 1026 are also cached portions of data 1006 in the flash 1007. The data cached in the SRAM 1026 can be treated in the same way as data in cached in the SDRAM 1009. Cached data is assumed to be the most recently or most frequently accessed from the host. However, for random one-time read accesses that do not necessarily qualify to be cached, the SRAM may also be used as a temporary store for such read data. The buffer gets immediately freed once the data is transferred to the host. The storage system is managed such that data transferred by the DMA controllers (not shown) to or from the host system and to or from hard drives or flash are always cached in the SDRAM or SRAM.

Code 1012 refers to low-level software that runs on the embedded processor. This code implements the algorithms for managing the storage system. "Code:O/S, Apps" 1013 refers to an OS kernel and application codes. Optionally, another embedded processor can be used to run applications under a conventional O/S, such as Windows, Linux, etc. Codes 1012 and 1013 are stored in the flash 1007. Since these are critical information, back-up copies 1016, 1017 are stored in the hard drives. The FPROM 1015 is another small-capacity non-volatile storage media that can be used to store a small amount of code 1014 that gets loaded on power-up. However, the initial code loaded on power-up could likewise be loaded from the flash 1007. The rest of the codes 1012, 1013 get paged from the flash 1007 to SRAM 1026. The 10 processor executes code off the SRAM 1026 unless it is cached in the first level processor's internal cache (not shown). Hence, the SRAM 1026 serves as a second level cache for the IO processor.

LBA-Flash-HDD Tables 1010 are control structures that maintain the mapping of data logical block addresses (LBA) to their physical locations in the flash and in the hard drives. Flash media caches data in the hard drive. Aside from the physical locations, there is also information relating to the state of the data in the flash (if they are modified, if they are in transit, if they are candidates for getting remapped to other flash locations, if they are candidates for getting flushed back to the HDD). The LBA-Flash-HDD tables 1010 are maintained by the IO processor. More details of maintaining the mapping of system logical block address to Flash physical block address and HDD block address can be found in U.S. application Ser. No. 11/450,005 "Optimized Placement Policy for Solid State Storage Devices", having a filing date of 6 Jun. 2006, which is incorporated herein by reference, and named the "Patent Application". The most frequently accessed portions 1027 are buffered in the SRAM 1026 which can be accessed the fastest by the IO processor. Less frequently accessed portions 1011 are buffered in the SDRAM 1009. On power-down, these tables 1027, 1011 are consolidated and the updates are flushed back to the table 1010 in the flash 1007 where they are permanently stored. Since these are critical information, a back-up copy 1016 is stored in the hard drives.

LBA-SDRAM Tables 1018, 1019 extend the LBA-Flash-HDD Tables to also include the mapping of data logical block addresses to their locations in the SDRAM, for those data blocks that are cached in the SDRAM. Aside from the SDRAM location, the table also has additional information relating to the state of the cached data blocks (if they are modified, if they are in transit, if they are candidates for getting flushed to the HDD or the flash). The LBA-SDRAM Tables 1018, 1019 are maintained by the IO processor. The most frequently accessed portions 1019 are stored in the SRAM 1026 which can be accessed the fastest by the IO processor. Less frequently accessed portions 1018 are stored in the SDRAM 1009. Since SDRAM 1009 and SRAM 1026 are volatile storage, LBA-SDRAM tables 1018, 1019 are initially empty, and get built as data blocks gets read from or written to the storage system.

Scratch Buffers 1020 is the collective term referring to the temporary storage area that buffers information for the IO processor at run-time e.g. those buffers that queue IO commands for processing, or scratchpad memory used by the OS and applications. Both the SRAM 1026 and SDRAM 1009 can be used to store such information. LBA-SDRAM Tables 1018, 1019 are control information generated only during run-time and are special cases of run-time information that use scratch buffers in the SRAM 1026 and SDRAM 1009.

DMA Instructions 1021 is another set of special case of run-time control information generated by the IO processor. They are generated for use by the DMA controllers. To respond to read/write requests from the host system, the IO processor creates DMA instructions 1021 for the IO DMA controller or PCI-Express/PCI-X/PCI DMA controller and stores them in the SDRAM 1009 or SRAM 1026. When transferring data blocks to/from the SDRAM to the flash, the IO processor creates DMA instructions for the flash DMA controller. When transferring data to/from the SDRAM to the hard disk drives, the IO processor creates DMA instructions for the IO DMA controller connected to the hard disk drives. A DMA instruction contains links to the next instruction; hence the DMA controllers can automatically fetch the DMA instructions stored in the SDRAM or SRAM. These DMA instructions contain the location in the SDRAM for the DMA controllers to fetch/store data.

ByteAdr-LBA Table 1022 refers to the byte address look-up table used by the PCI-Express/PCI-X/PCI interface DMA controller to look-up the block address associated with the byte or word address. A CAM 1023 is employed for this purpose.

FIG. 10*b* is a diagram illustrating an example data structure for a LBA-Flash-HDD mapping table according to an embodiment of the present invention. The actual location of data in the mechanical hard drives as well as cached location in the flash is independently determined by the embedded IO processor without host intervention. For example, if the host uses logical block addresses or LBAs to reference data, such LBAs, are translated to physical locations by the IO processor. The IO processor optimizes the physical locations in the hard disks and the flash so that frequently or most recently accessed data are stored in the flash so that they can be accessed in the quickest fashion. An example of such optimization is to distribute a set of LBAs accessed in unison by the host to different devices in the flash array, so that portions of the LBA set can be accessed concurrently. The host accesses can be tracked and the access behavior is used to optimize access performance. The LBA-Flash-HDD tables refer to the data structures maintained by the embedded processors in order to associate data accesses by the host to their physical locations in the flash and hard drives, and also to allocate locations in the flash array for those data that are recently or most frequently accessed. It is beneficial to place such data in the flash since transferring data between flash and SDRAM is faster than between hard drives and the SDRAM. Each entry in the table associates a set of LBAs addressed by the host to information regarding their locations in the flash and hard drives.

The information contained in the table is subdivided into the flash remap table and HDD remap table. The flash remap table includes information on the physical location (physical block address or PBA) of cached data blocks in the flash array. This particular information is used by the IO processor to build DMA instructions which are interpreted by the flash DMA controller to control the flash device or group of flash devices. Aside from the present physical location, the table also includes information on the caching state of the data. This information indicates how the cached data in the flash differs compared to its counterpart permanently stored in the hard drives. Such information includes: if that set of data is not yet stored in the hard drives, if they are fully or partly modified, if they are currently in transit and should not be allowed access yet, etc. Lastly, the flash remap table also includes other control information relating to the usage of the physical flash blocks. Such information determines if the data is a good candidate to get moved to other flash blocks either to prolong the life of the flash, or as part of optimizations to improve the accesses to the data by the host.

The HDD remap table includes location information (physical block address or PBA) and other control information such as HDD usage statistics. Location information is used by the IO processor to build DMA instructions that are interpreted by the IO DMA controller allowing it to uniquely address the data in the hard drives. IO interfaces such as SCSI or ATA typically use LBA or CHS addressing schemes to address data in hard drives. The usage statistics are additional information relating to the frequency and patterns of usage of the addressed disk sectors or locations. This information can be used by the IO processor in algorithms that optimize the distribution of data to the disks and improve accesses to the data by the host. More details of the optimized method for maintaining the LBA-Flash-HDD mapping table illustrated in FIG. 10b can be found in the Patent Application.

FIG. 10c is a diagram illustrating an example data structure for LBA-SDRAM mapping table according to an embodiment of the present invention. If the SRAM is also used as a cache in the same manner as the SDRAM, then the LBA-SDRAM table also applies to data in the SRAM. The SDRAM/SRAM provides the fastest access to the host, hence all data written by the host are first buffered in the SDRAM/SRAM. Also, data read by the host are first read off the flash or hard drive to the SDRAM/SRAM. The LBA_SDRAM tables refer to the data structures maintained by the embedded processors in order to associate host data accesses to their locations in the SDRAM/SRAM cache. Each entry in the table associates a set of LBAs addressed by the host to information regarding their temporary location in the SDRAM/SRAM, and their original or eventual location in permanent storage (flash or hard drive). In general, the LBA_SDRAM tables include information such as: the location of the cached data blocks in the SDRAM/SRAM, control information such as the caching state of the data blocks, etc. The location information allows the SDRAM DMA controller or SRAM controller to physically control the SDRAM devices and access the data. The caching state indicates how the cached data in the SDRAM differs compared to the version cached in the flash or stored in hard drives. The caching state include information such as: if that set of data is not yet allocated permanent storage, if they are fully or partly modified, if they are currently in transit and should not be allowed access yet, etc. If the data gets permanent allocation in the flash or hard drives, then there is a corresponding entry in the LBA-Flash-HDD tables. More details of the optimized method for maintaining the LBA-SDRAM mapping table illustrated in FIG. 10c can be found in the Patent Application.

Figure 11:
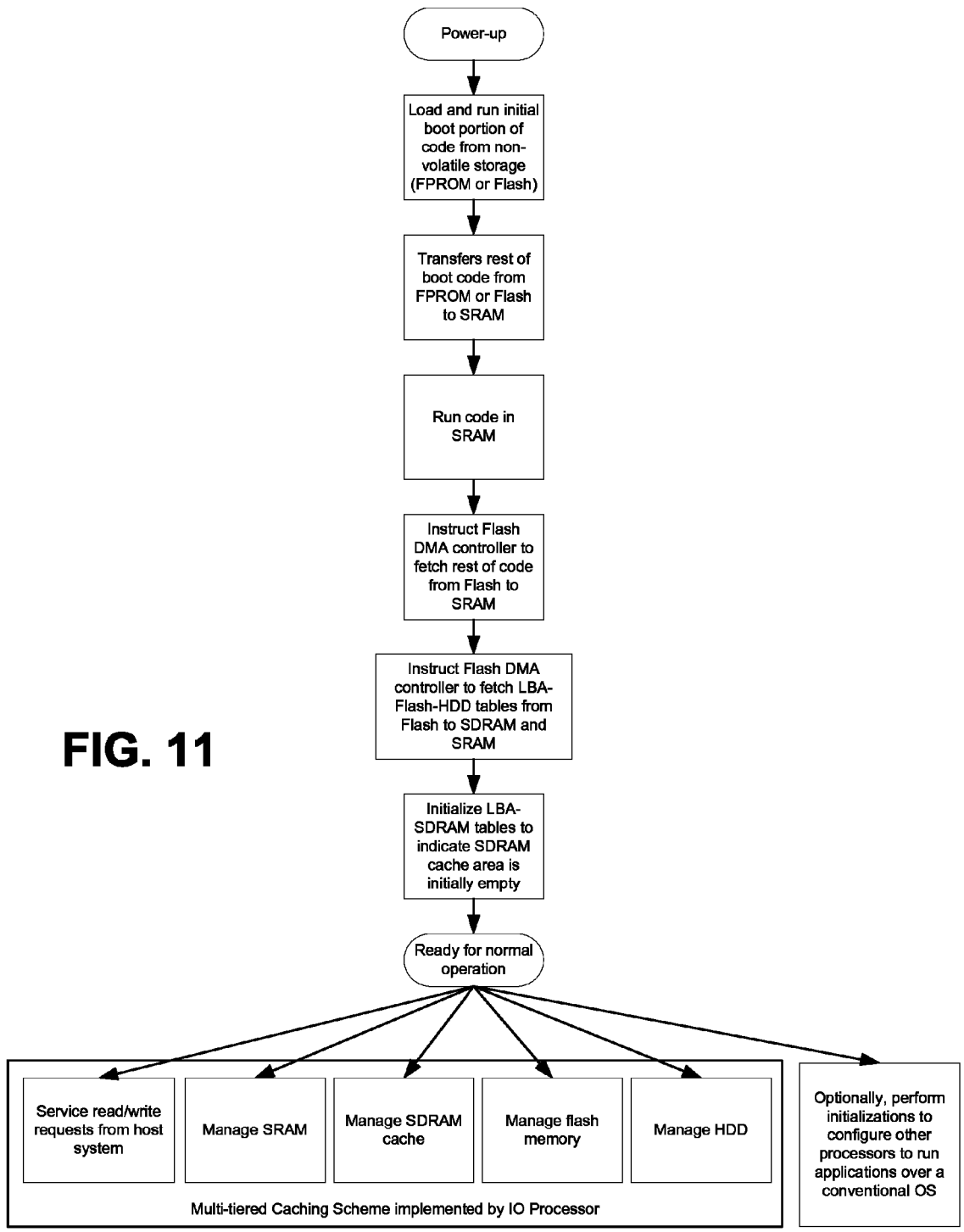
FIG. 11 is a diagram illustrating a power up initialization process flow according to an embodiment of the present invention.

FIG. 11 is a diagram illustrating a power up initialization process flow applicable to the embodiments of the present invention as illustrated in FIGS. 1, 2 and 3. This process pertains to the movement of the codes and the movement and update of the control structures and data. The initial code loaded to the embedded processor internal cache memory is permanently stored in the FPROM such as 1015 in FIG. 10. An initial portion of the code executed by IO processor transfers the rest of the code in the FPROM to the SRAM, which is the memory providing fastest-access to the IO processors and serves as a level-2 cache to the IO processor. Since the FPROM is a small capacity device, the rest of the code for the IO processor and other codes such as an OS kernel or applications optionally run by another embedded processor are stored in the flash. Portions of these codes are paged to the SRAM for execution. The initial code loaded from the FPROM to the SRAM includes the routines for instructing the flash DMA controller to page the next set of routines to be executed. Following the routines for paging code from the FPROM to the SRAM, the power up initialization also entails partitioning of the SDRAM into areas for caching data and areas for storing control structures. The flash DMA controller is instructed to fetch an initial set of control structures e.g. the control structure that holds the location information of the LBA-Flash-HDD tables in the flash. The next step is to initialize the LBA_SDRAM tables to indicate the SDRAM cache area is empty. After this initialization to the SDRAM, the system is ready to commence normal operation. During normal operation, the IO processor services read/write requests from the host as well as manage the different storage media (SRAM, SDRAM, flash and HDD). The other processor(s) can run other applications. As data is transferred between the different devices in the system, management of the storage media entails updates to the different control structures as well as periodic saving of such structures to the permanent storage media (flash and hard disks).

Figure 12:
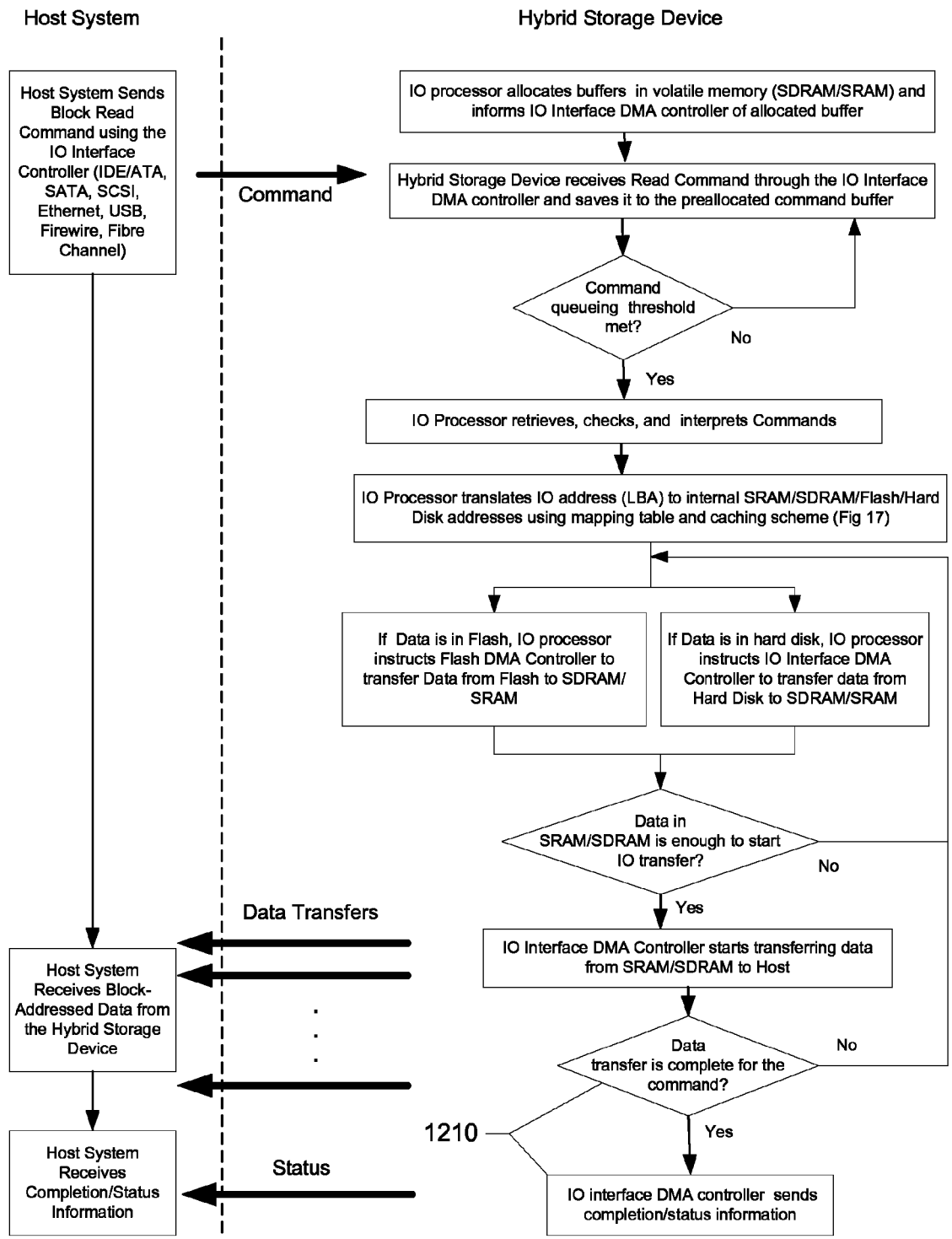
FIG. 12 is a diagram illustrating a process flow of a block read command from a host computer system according to an embodiment of the present invention.

FIG. 12 is a diagram illustrating a process flow of a block read command from a host computer system primarily applicable to the embodiments of the present invention as illustrated in FIGS. 5, 7 and 9. The left side of the figure shows activities of the host system performing a block read operation on the hybrid storage device. The right side of the figure shows activities within the hybrid storage device upon receiving a block read command from the host system. The block IO transfer protocol (ATA or SCSI) allows the storage device to queue up the received commands and to respond with the requested data blocks within an extended period of time.

The hybrid storage device reduces the response time by using the flash intermediate cache between the SRAM/SDRAM and the hard disk(s). Because the instructions to the DMA controllers can be linked, the IO processor can build several such instructions in the background and link them. Using the instruction link, the DMA controllers can automatically fetch the next instruction from memory and perform the instructed transfer without additional intervention from the IO processor. Once the amount of data transferred from non-volatile storage (flash and hard disk) to volatile (SRAM/SDRAM) storage reaches a pre-determined threshold, the IO Interface DMA controller is triggered to start transferring data blocks to the host system. Status information of the block read command is sent after the hybrid storage device delivers the requested data block.

Figure 13:
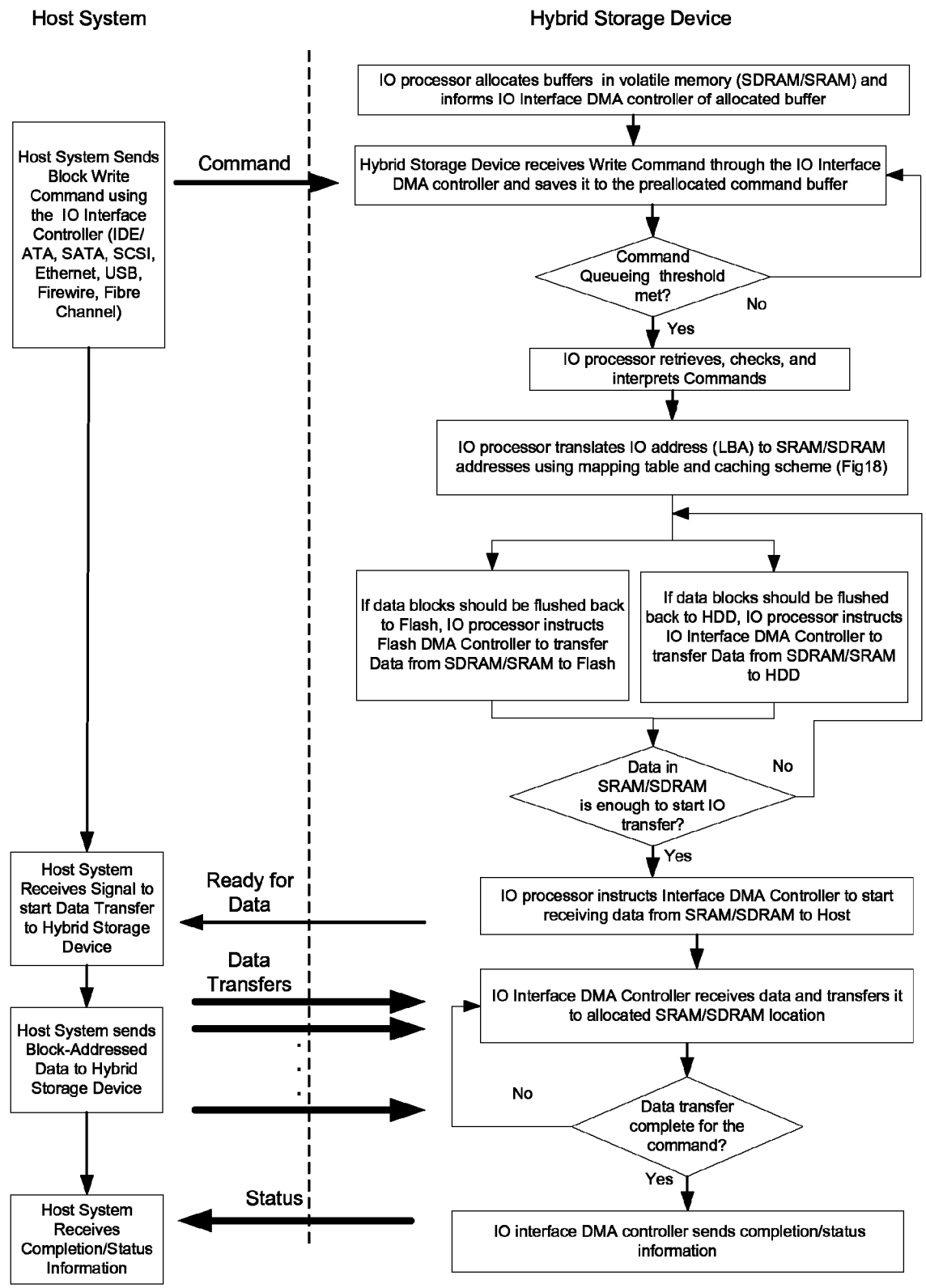
FIG. 13 is a diagram illustrating a process flow of a block write command from a host computer system according to an embodiment of the present invention.

FIG. 13 is a diagram illustrating a process flow of a block write command from a host computer system primarily applicable to the embodiments of the present invention as illustrated in FIGS. 5, 7 and 9. The left side of the figure shows activities of the host system performing a block write operation on the hybrid storage device. The right side of the figure shows activities within the hybrid storage device upon receiving a block write command from the host system. The block IO transfer protocol (ATA or SCSI) allows the storage device to queue up the received commands and to indicate when it is ready to receive the data blocks from the host system.

The hybrid storage device reduces the response time by using the flash intermediate cache between the SRAM/SDRAM and the hard disk(s). Because the instructions to the DMA controllers can be linked, the IO processor can build several such instructions in the background and link them. Using the instruction link, the DMA controllers can automatically fetch the next instruction from memory and perform the instructed transfer without additional intervention from the IO processor. If necessary, data must be flushed back from the volatile storage (SRAM/SDRAM) to the flash. In this case the flash DMA controller is triggered to transfer data from the SRAM/SDRAM to the flash. If necessary, data must be flushed back from the volatile storage (SRAM/SDRAM) to the hard disk. In this case the IO Interface DMA controller connected to the hard disk is triggered to transfer data from the SRAM/SDRAM to the hard disk. When the available space in the volatile storage (SRAM/SDRAM) buffer reaches a second pre-determined threshold, the IO Interface DMA controller is triggered to continue receiving data blocks from the host system. Status information for the block write command is sent after the hybrid storage system is able to write all the data.

Figure 14:
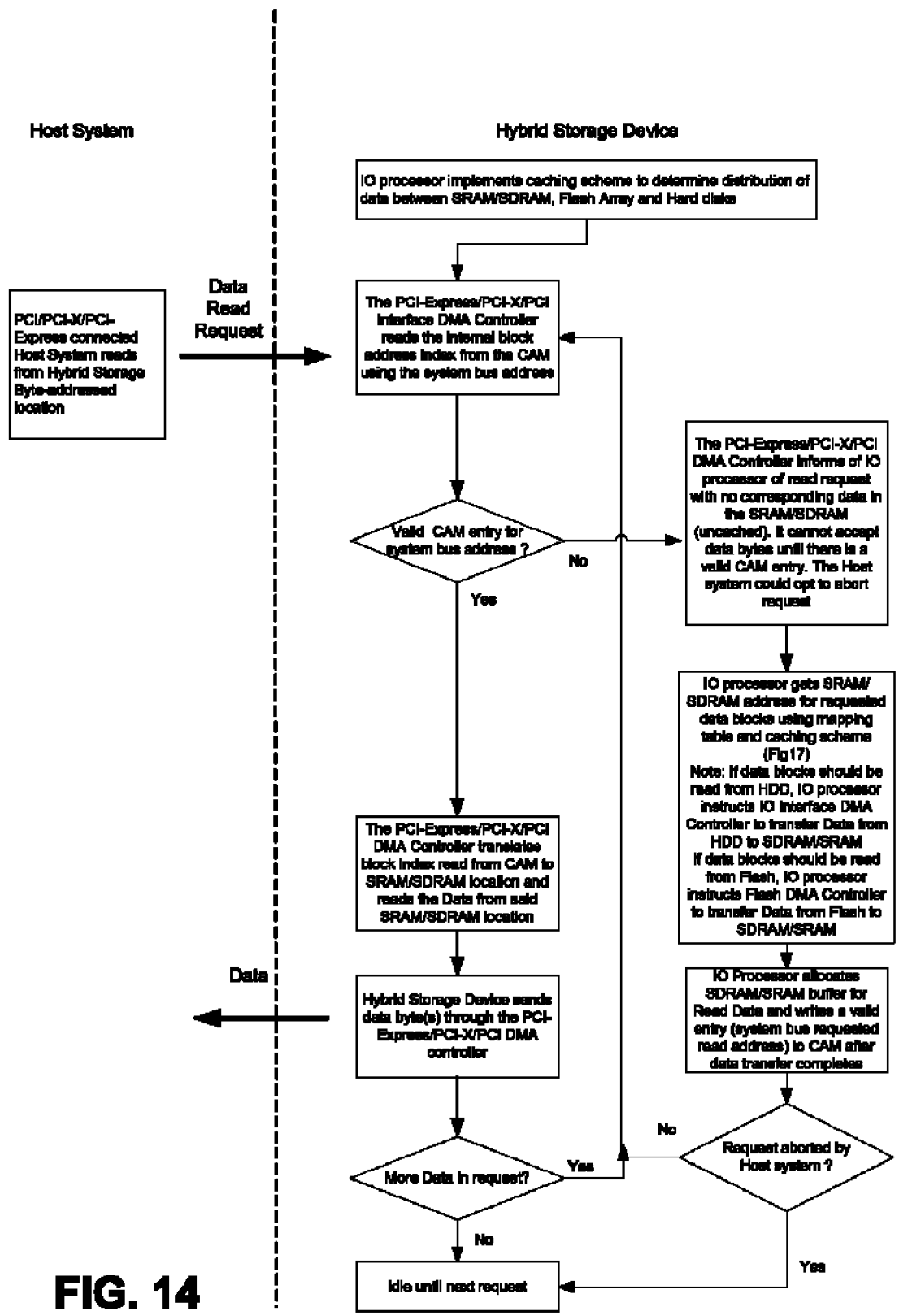
FIG. 14 is a diagram illustrating a process flow of a random byte-addressed read access to the hybrid storage device according to an embodiment of the present invention.

FIG. 14 is a diagram illustrating a process flow of a random access byte read request received via the system bus applicable to an embodiment of the present invention as illustrated in FIGS. 2 and 3. The left side of the figure shows activities of the requesting device connected to the system bus. The right side of the figure shows activities within the hybrid storage device upon receiving a random access byte read request.

Given the address of the requested read data, the PCI-Express/PCI-X/PCI DMA controller 111 as illustrated in FIG. 1 can look up that address in the CAM 112. If the CAM returns a valid match for the address, then the index of the entry also returned by the CAM corresponds to the index of the data block in the SRAM or SDRAM that contains the requested read data. The SRAM 105 and SDRAM 108 are also illustrated in FIG. 1. The PCI-Express/PCI-X/PCI DMA can translate the data block index to the SRAM or SDRAM address and continue to read the data. However, if the CAM does not return a valid match, then it means none of the data blocks currently cached in the SRAM or SDRAM contain the requested read data. In this case, the PCI-Express/PCI-X/PCI DMA controller shall inform the IO processor 103 illustrated in FIG. 1 and give the address. The IO processor then uses mapping tables and the procedure illustrated in FIG. 17 to locate the data and transfer data from either the flash or the hard disk to a free data block location in the SRAM or SDRAM. When the transfer is complete, the IO processor writes the requested read data address to the CAM entry whose index corresponds to the data block index in the SRAM or SDRAM that now contains the requested read data. The PCI-Express/PCI-X/PCI DMA controller upon detecting the valid CAM match, can proceed to reading the requested data.

Figure 15:
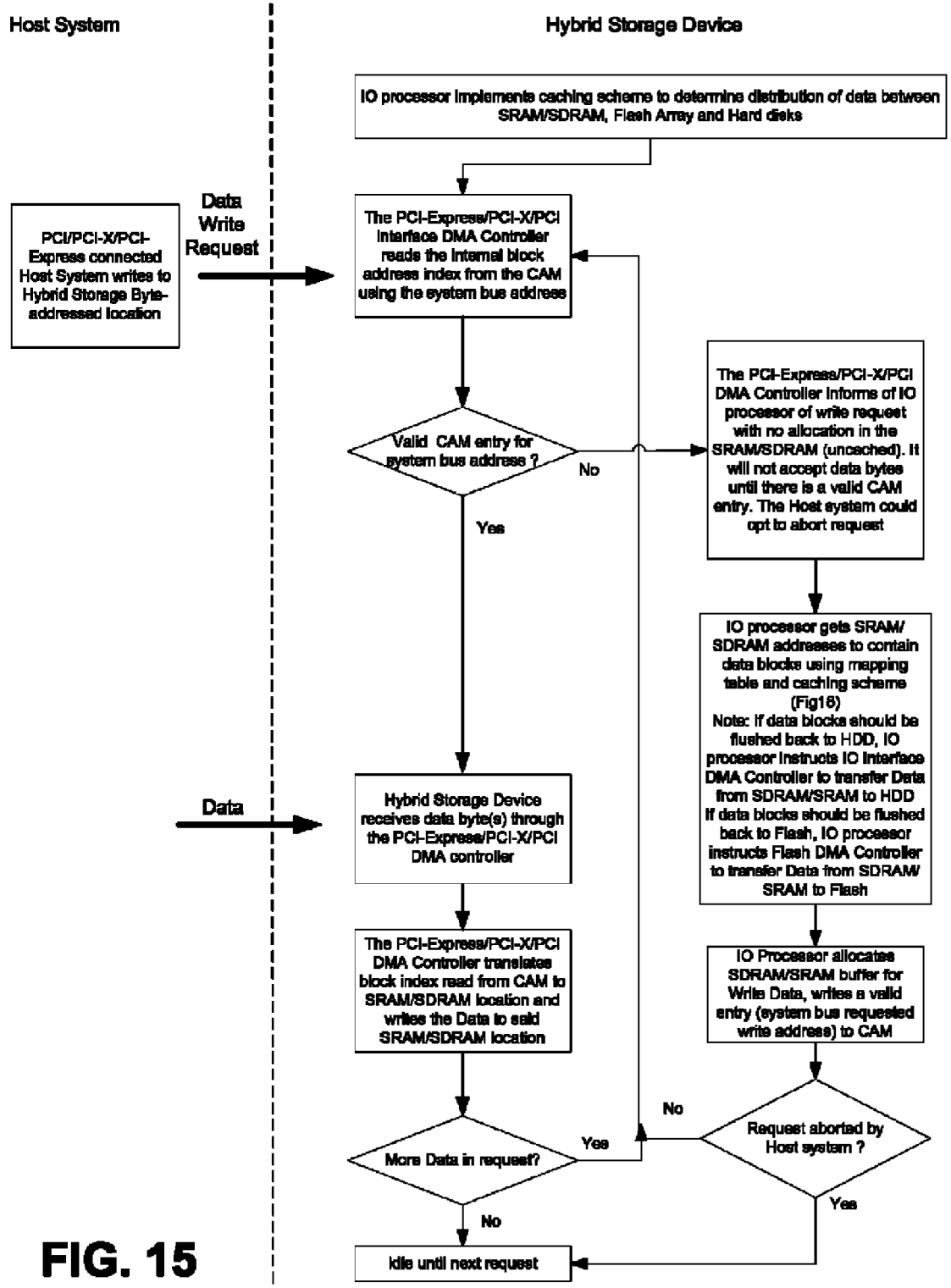
FIG. 15 is a diagram illustrating a process flow of a random byte-addressed write access to the hybrid storage according to an embodiment of the present invention.

FIG. 15 is a diagram illustrating a process flow of a random access byte write request received via the system bus applicable to an embodiment of the present invention as illustrated in FIGS. 2 and 3. The left side of the figure shows activities of the requesting device connected to the system bus. The right side of the figure shows activities within the hybrid storage device upon receiving a random access byte write request.

Given the address of the write request, the PCI-Express/PCI-X/PCI DMA controller 111 as illustrated in FIG. 1 can look up that address in the CAM 112. If the CAM returns a valid match for the address, then the index of the entry also returned by the CAM corresponds to the index of the data block in the SRAM or SDRAM where the data can be written. The SRAM 105 and SDRAM 108 are also illustrated in FIG. 1. The PCI-Express/PCI-X/PCI DMA can translate the data block index to the SRAM or SDRAM address and accept the write the data then write to the SRAM or SDRAM. However, if the CAM does not return a valid match, then it means none of the data blocks currently cached in the SRAM or SDRAM contain a data location that can be written with the data. In this case, the PCI-Express/PCI-X/PCI DMA controller shall inform the processor 103 illustrated in FIG. 1 and give the write address. The IO processor then the procedure illustrated in FIG. 18 to get a data block location in the SRAM or SDRAM where the data can be written. The IO processor writes the write address to the CAM entry whose index corresponds to the data block index in the SRAM or SDRAM that can now contain the requested write data. The PCI-Express/PCI-X/PCI DMA controller upon detecting the valid CAM match, can proceed to accept the write data and write it to the SRAM or SDRAM.

FIG. 16 is a diagram illustrating a process flow of a DMA transfer according to an embodiment of the present invention. The left side of the figure shows activities of the IO processor upon determining that it needs to instruct a DMA controller to perform a DMA transfer. The right side of the figure shows activities of a DMA controller upon being activated by the IO processor to perform a data transfer. Because the DMA instructions can be linked, the processor can build several such instructions in the background and link them. Using the instruction link, the DMA controller can automatically fetch the next instruction from memory and perform the instructed transfer without additional intervention from the IO processor. This process flow is performed as part of the response to read/write requests from the host system, or as part of management functions for the different storage media or for any other purpose that involves DMA transfers.

Figure 17:
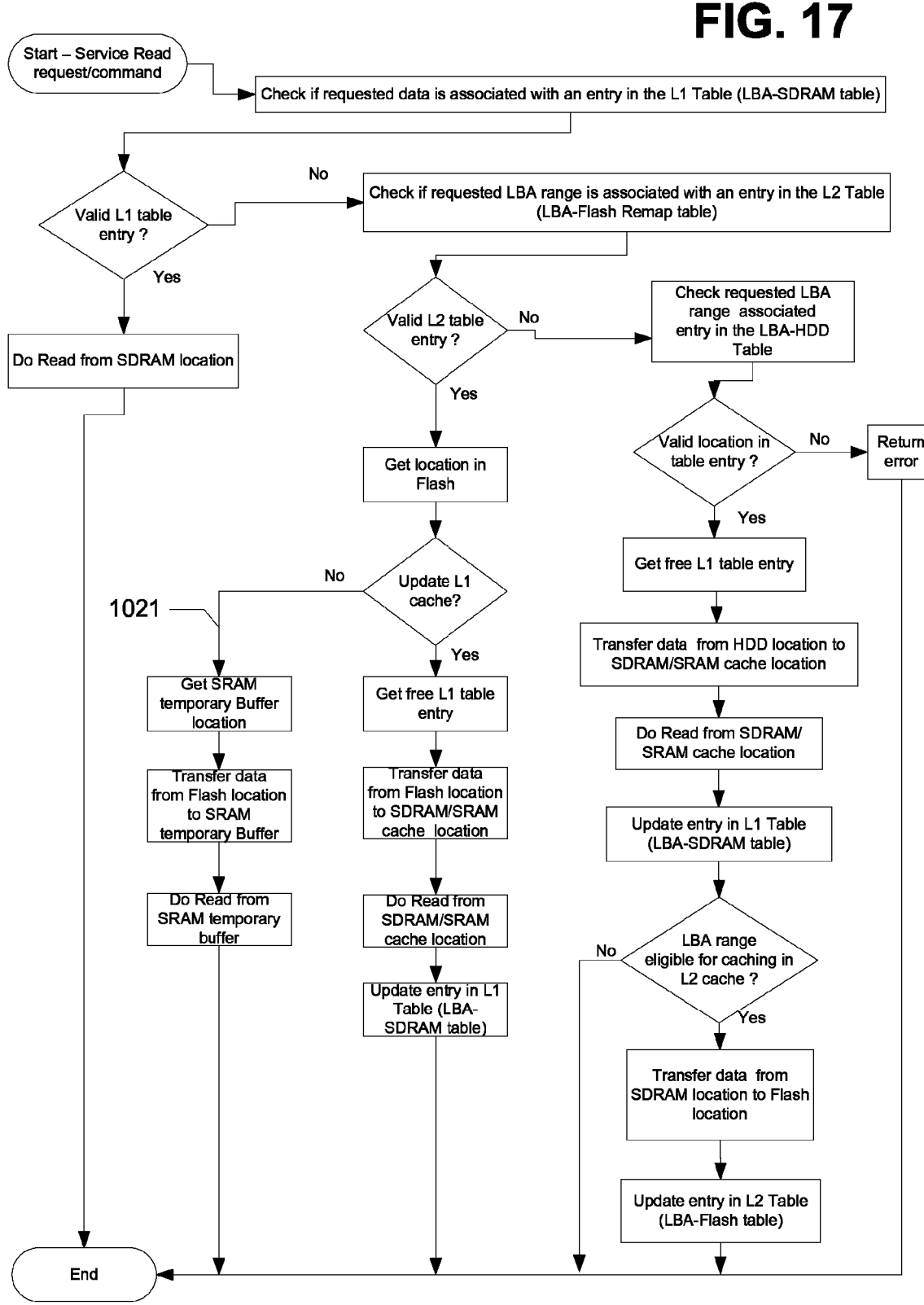
FIG. 17 is a diagram illustrating a process flow of the update of the mapping tables in response to a read request according to an embodiment of the present invention.
Figure 18:
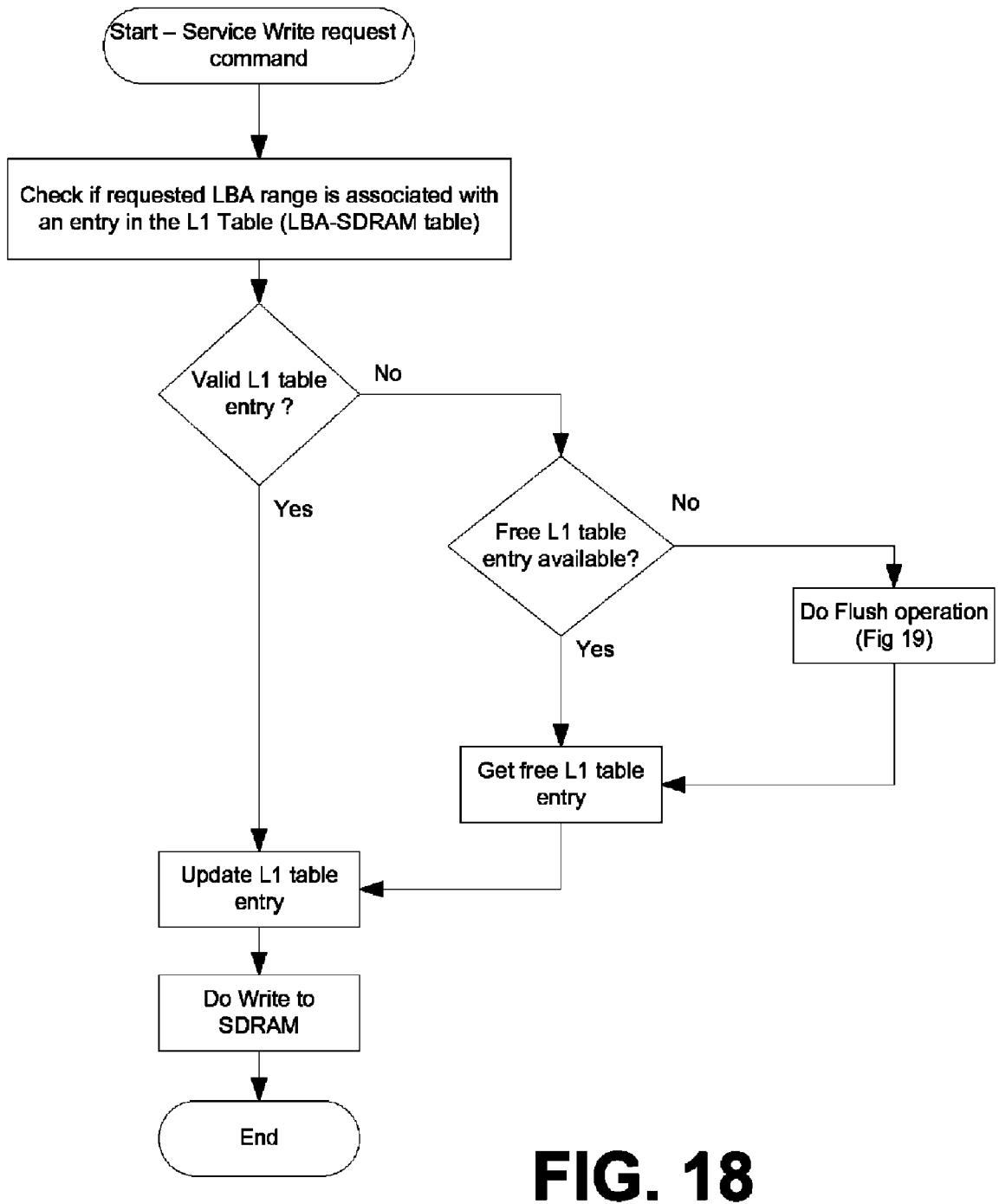
FIG. 18 is a diagram illustrating a process flow for updating the mapping tables in response to a write request according to an embodiment of the present invention.
Figure 19:
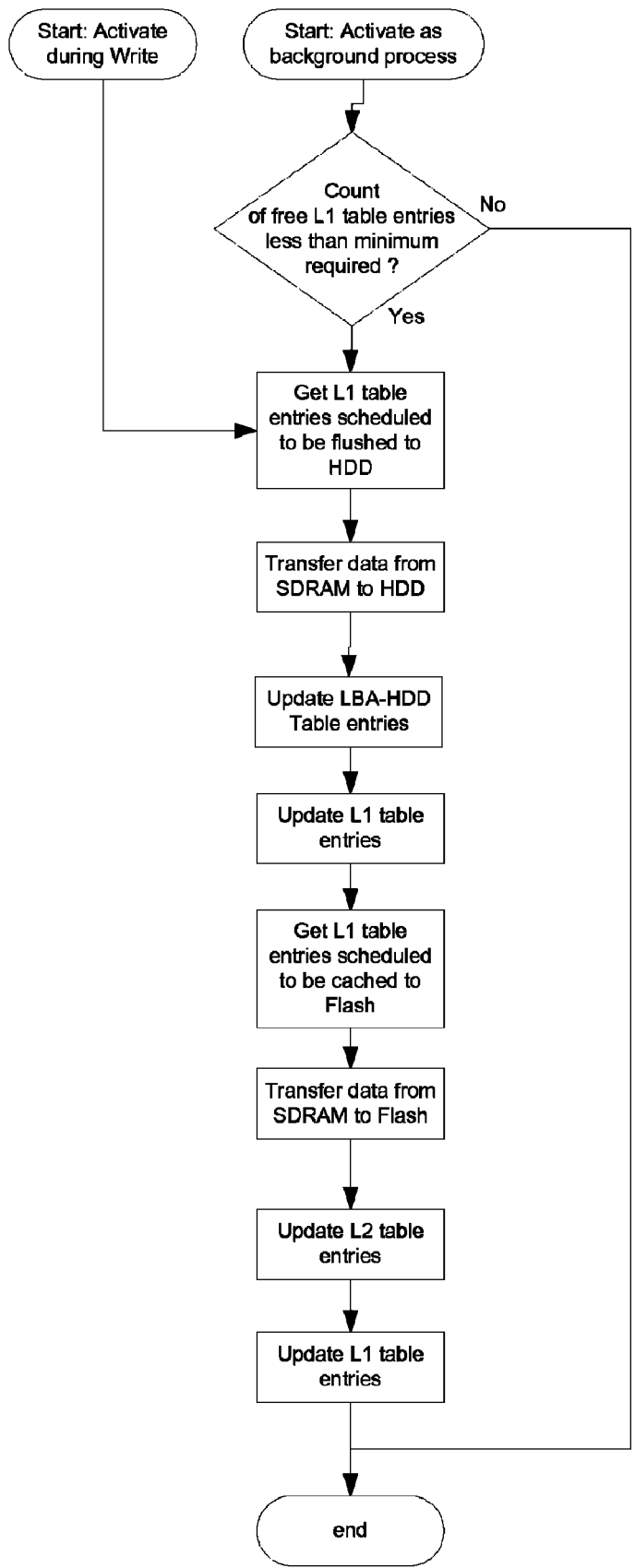
FIG. 19 is a diagram illustrating a process flow for updating the mapping tables during a data flush operation in response to a write request or activated as a background process according to an embodiment of the present invention.

FIGS. 17, 18 and 19 are diagrams of an example of a basic caching algorithm that can be applied to the multi-tiered storage system. Both data and control information are cached in the system. The SRAM, being the media that provides the fastest access for the IO processor, is ideal for caching control structures used by the IO processor such as the different mapping tables which are also stored in the SDRAM. The SRAM can also serve as a level-2 cache for storing the code run by the processors. However, it may also serve as a data cache to supplement the SDRAM. In FIGS. 17, 18 and 19, only the SDRAM is mentioned but the SRAM may be used as to cache data as well. The data caching scheme is implemented by the IO processor code and can thus be programmed to be optimized for the application of the system. In particular, the caching scheme illustrated in FIGS. 17, 18 and 19 shows the usage of the SDRAM as a Level-1 data cache and the Flash as a Level-2 data cache. FIG. 17 is a high-level flow chart showing how the mapping tables are used and updated in response to a read request from a host system. The figure shows the option wherein data for a read request that is stored in the Flash is not to be cached and instead is temporarily stored in the SRAM 1701. FIG. 18 is a high-level flow chart showing how the mapping tables are used and updated in response to a write request from a host system. FIG. 19 shows the procedure for flushing of data back to the HDD and caching of data in the Flash both of which can be triggered as a background process or during writes when a cache full occurs. To minimize cache full during writes, a minimum count of entries in the L1 table is kept eligible for getting replaced so write requests can be immediately accepted. An entry in the L1 can be replaced if the corresponding data has been flushed back to either the Flash of the HDD or if the data block is clean. In the illustrated scheme, all data access requests from the connected host system are read from and written to the SDRAM which serves as the Level-1 (L1) cache. The Flash serves as a Level-2 (L2) cache storing copies of certain portions of data permanently stored in the HDD. The algorithm that decides which portions to cache in the L2 cache may differ. A basic criterion could be to store those portions that are most recently accessed.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that the data storage system maybe distributed comprising devices connected through a network, and that the network may be wired, wireless, or a combination of wired and wireless. Other variations and embodiments are possible in light of above teachings, and it is thus intended that the scope of invention not be limited by this Detailed Description, but rather by Claims following.

We claim:

1. A data storage system for storing and retrieving computer data using at least one logical address without intervention from an external host, the data storage system comprising:
   an IO processor for controlling data input or output of the data storage system;
   a disk drive for storing a first block of data, the first block of data comprising data transferred from the external host and control data for the IO processor, the disk drive associated with a disk drive address;
   a flash memory means that includes at least one flash memory that is disposed to store a second block of data, the second block of data comprising data transferred from the external host, a cached portion of data stored in the disk drive and control data for the IO processor, the flash memory associated with a flash address; and
   a LBA-Flash-HDD table that includes a first portion disposed to map a logical address to the flash address and a second portion disposed to map the logical address with the disk drive address, the LBA-Flash-HDD table for enabling the IO processor to perform a memory operation on the flash memory, the disk drive, or both without intervention by the external host;
   wherein the FAST memory means comprises:
   SDRAM memory means for storing one or more block of data, the data comprising the data transferred from the external host, the cached portion of data stored in the flash memory means and the control data for the IO processor;
   SRAM memory means comprising one or more SRAM for storing the one or more block of data, the data comprising the control data for the IO processor means;
   wherein the LBA_FAST table is stored in the SDRAM memory means and cached in the SRAM memory means;
   wherein the LBA-Flash-HDD table is stored in the flash memory means and cached in the FAST memory means wherein a first cached portion is stored in the SRAM memory means and a second cached portion containing the remainder of the LBA-Flash-HDD table is stored in the SDRAM memory means; and
   wherein a back-up copy of the LBA-Flash-HDD table is stored in the disk drive.

2. The data storage system of claim 1, wherein the LBA-Flash-HDD table is updated from time to time according to a data access behavior pattern of the external host without intervention by the external host.

3. The data storage system of claim 1, further comprising:
   a FAST memory means for storing one or more blocks of data, the data comprising data transferred from the external host, a cached portion of data stored in the flash memory means and control data for the IO processor;
   a LBA_FAST table disposed to map the logical address to the one or more blocks of data, and to store control information of the one or more blocks of data; and
   wherein the IO processor is disposed to access the cached portion of data stored in the flash memory means by using the LBA_FAST table without intervention by the external host.

4. The data storage system of claim 3, wherein the LBA_FAST table and the LBA-Flash-HDD table are updated from time to time according to a data access behavior pattern of the external host without intervention by the external host.

5. The data storage system of claim 1, further comprising:
   SDRAM DMA controller means for transferring data to or from the SDRAM memory means responsive to one or more DMA instruction;
   flash DMA controller means for transferring data to and from the flash memory means responsive to one or more DMA instruction;
   wherein the IO processor prepares one or more DMA instructions by using the LBA_FAST table and the LBA-Flash-HDD table; and
   wherein the control data for the IO processor stored in the FAST memory means further comprises the one or more DMA instructions.

6. The data storage system of claim 1, further comprising:
   a host DMA controller disposed to transfer data to or from the external host in response to receiving the one or more DMA instructions;
   a CAM memory disposed to store a byte address look up table;
   wherein the host DMA controller means transfers data to and from the external host without the IO processor preparing the DMA instruction upon the byte address look-up table containing valid entry for the data requested by the external host; and
   an IO DMA controller disposed to transfer data to or from the disk drive in response to the one or more DMA instructions;
   wherein the external host is coupled to the host DMA controller; and
   wherein the disk drive is coupled to the IO DMA controller via an IO interface selected from the group consisting of IDE/ATA, serial ATA, USB, FIREWIRE, SCSI, FIBER CHANNEL, and ETHERNET.

7. The data storage system of claim 1, further comprising:

a first IO DMA controller disposed to transfer data to or from the external host in response to one or more DMA instructions; and a second IO DMA controller disposed to transfer data to or from the disk drive in response to one or more DMA instructions;

wherein the external host is coupled to the first IO DMA controller; and wherein the disk drive is coupled to the second IO DMA controller.

8. The data storage system of claim 1, further comprising:

an IO DMA controller disposed to transfer data to or from the external host in response to one or more DMA instructions; and an external bus interface DMA controller disposed to transfer data to or from the disk drive in response to one or more DMA instructions;

wherein the external host is coupled to the IO DMA controller; and wherein the disk drive is coupled to the external bus interface DMA controller.

9. A data structure for storing mapping information of a data storage system, the data storage system comprising a disk drive, a flash memory, a SDRAM memory, and SRAM memory, the data structure comprising:

a LBA-Flash-HDD table comprising one or more logical addresses, one or more corresponding flash addresses, and one or more corresponding disk drive addresses;

a LBA_SDRAM table comprising one or more logical addresses, one or more corresponding SRAM addresses, and one or more corresponding SDRAM addresses;

wherein a first portion of a working copy of the LBA-Flash-HDD table is stored in the SRAM memory, a second portion of the working copy is stored in the SDRAM memory; and wherein the LBA_SDRAM table is stored in the SDRAM memory, a cached portion of the LBA_SDRAM table is stored in the SRAM memory means.

\* \* \* \* \*